US008417371B2

(12) United States Patent
Werfeli et al.

(10) Patent No.: US 8,417,371 B2
(45) Date of Patent: Apr. 9, 2013

(54) CONTROL UNIT WITH TOUCHSCREEN KEYS

(75) Inventors: Friedrich Werfeli, Schwändi (CH); Jens Hutter, Mollis (CH)

(73) Assignee: Netstal-Maschinen AG, Näfels (CH)

( * ) Notice: Subject to any disclaimer, the term of this patent is extended or adjusted under 35 U.S.C. 154(b) by 0 days.

(21) Appl. No.: 12/518,783

(22) PCT Filed: Dec. 10, 2007

(86) PCT No.: PCT/EP2007/063629
§ 371 (c)(1),
(2), (4) Date: Jun. 11, 2009

(87) PCT Pub. No.: WO2008/071669
PCT Pub. Date: Jun. 19, 2008

(65) Prior Publication Data
US 2010/0138031 A1    Jun. 3, 2010

(30) Foreign Application Priority Data

Dec. 13, 2006   (CH) .................................... 2027/06
Jun. 27, 2007   (CH) .................................... 1034/07

(51) Int. Cl.
G05B 19/409   (2006.01)
G06F 3/048    (2006.01)

(52) U.S. Cl.
USPC ............... 700/197; 700/83; 700/84; 715/702; 715/773

(58) Field of Classification Search .................... 700/83, 700/84, 197, 200; 715/701, 702, 733, 773, 715/771, 970, 965, 840; 264/40.1
See application file for complete search history.

(56) References Cited

U.S. PATENT DOCUMENTS

| 6,492,978 | B1 | 12/2002 | Selig et al. | |
|---|---|---|---|---|
| 6,684,264 | B1 * | 1/2004 | Choi | 710/15 |
| 2004/0046746 | A1 | 3/2004 | Monson | |
| 2004/0090428 | A1 | 5/2004 | Crandall, Jr. et al. | |
| 2005/0164148 | A1 * | 7/2005 | Sinclair | 434/112 |
| 2006/0247821 | A1 * | 11/2006 | Nishizawa et al. | 700/200 |
| 2007/0106943 | A1 * | 5/2007 | Schiffer | 715/733 |
| 2007/0152975 | A1 * | 7/2007 | Ogihara et al. | 345/173 |

FOREIGN PATENT DOCUMENTS

| EP | 0 573 912 A1 | 12/1993 |
|---|---|---|
| WO | WO 01/96969 | 12/2001 |
| WO | WO 2005/029983 | 4/2005 |
| WO | WO 2005/050428 | 6/2005 |
| WO | WO 2005/076117 | 8/2005 |
| WO | WO 2007/025396 | 3/2007 |

* cited by examiner

Primary Examiner — Jeffrey A Gaffin
Assistant Examiner — Steven Garland
(74) Attorney, Agent, or Firm — Henry M Feiereisen LLC

(57) ABSTRACT

The novel invention relates to a method and an apparatus for controlling one or more machines or a production cell with repeatable sequences using a machine controller, and to an operating unit in the form of a man-machine interface (MMI). The novel invention proposes making at least some of the operative control inputs for machine movement using haptic keys which can be programmed for their function and are applied to a screen and/or tactile touchscreen keys which can be seen and sensed, for example with an edge which can be sensed, with a respective associated screen field. The operator is thus provided with a guide function for operation, whether by the fact that he haptically senses the keystroke, for example via snap domes, or by the fact that he only tactually feels an edge around the screen key.

22 Claims, 16 Drawing Sheets

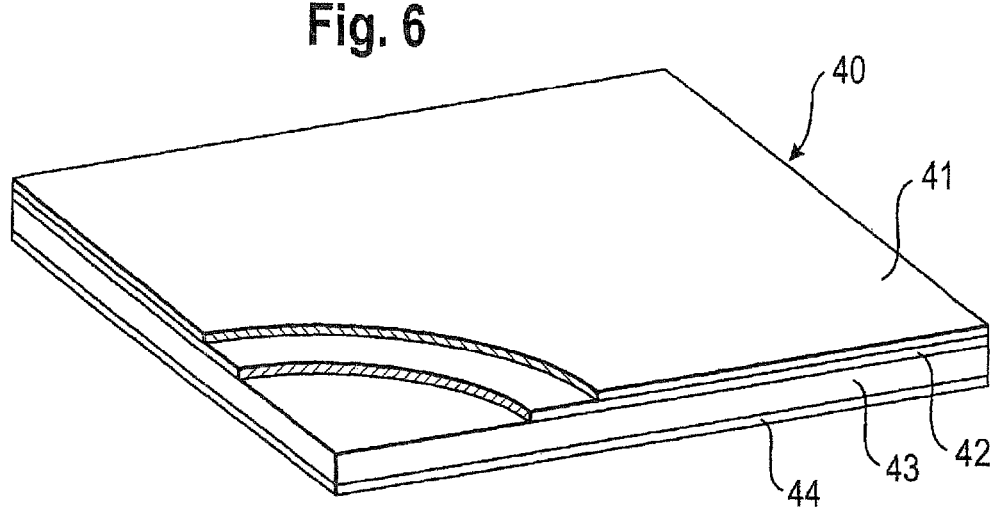
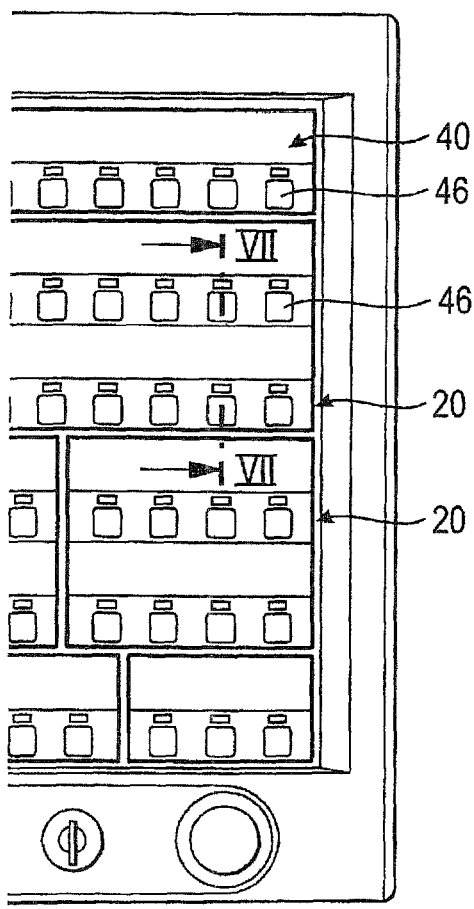
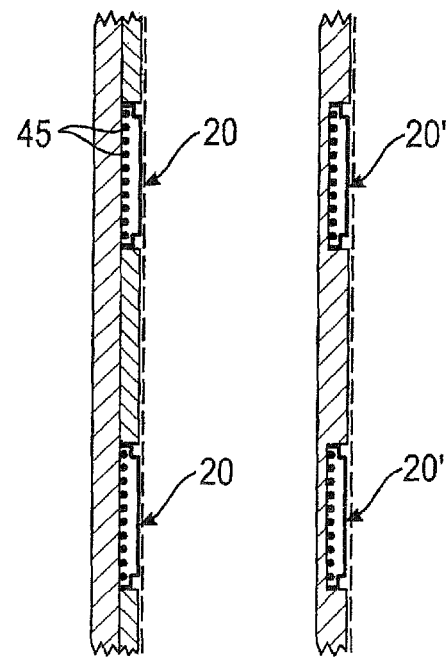

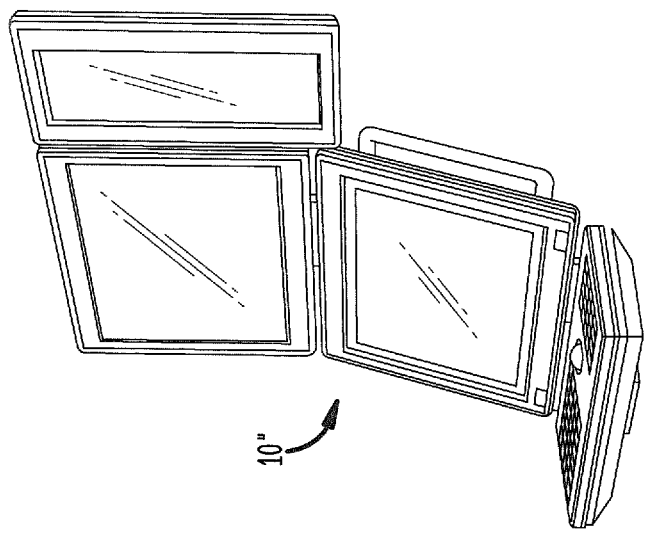
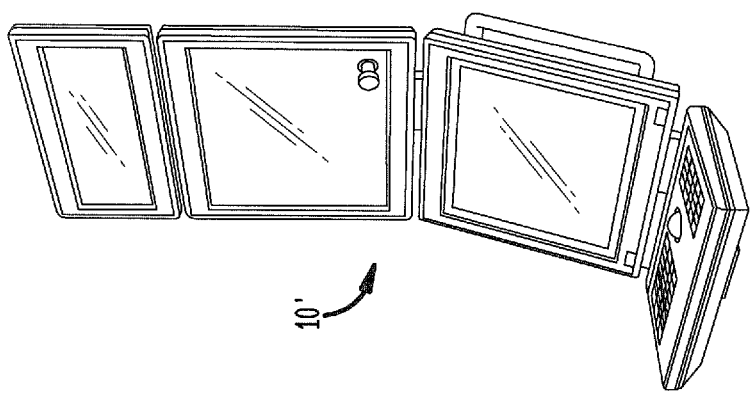
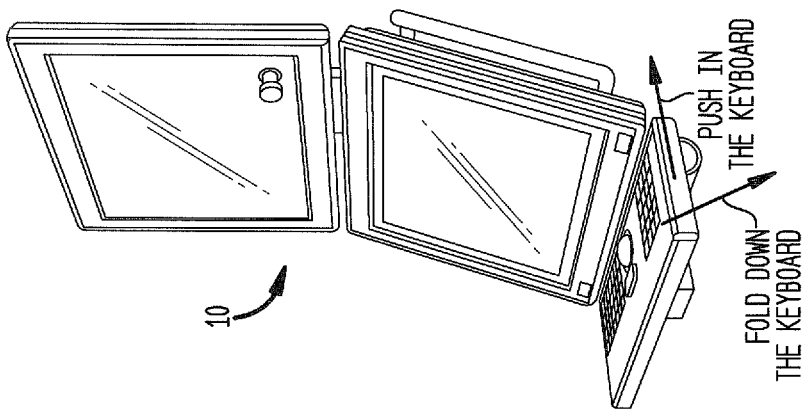

PROCESS EDITOR

Fig. 11a
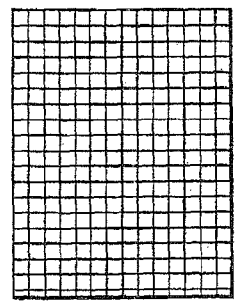
19"TFT
1280 x 1024P
376 x 301
Fig. 11b
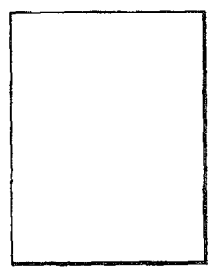
17"TFT
1280 x 1024P
338 x 270
Fig. 11c
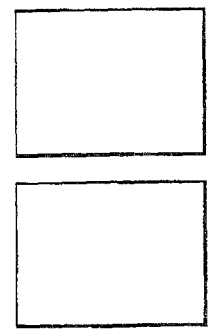
2 x 15"TFT
1024 x 768P
2 x 301 x 225
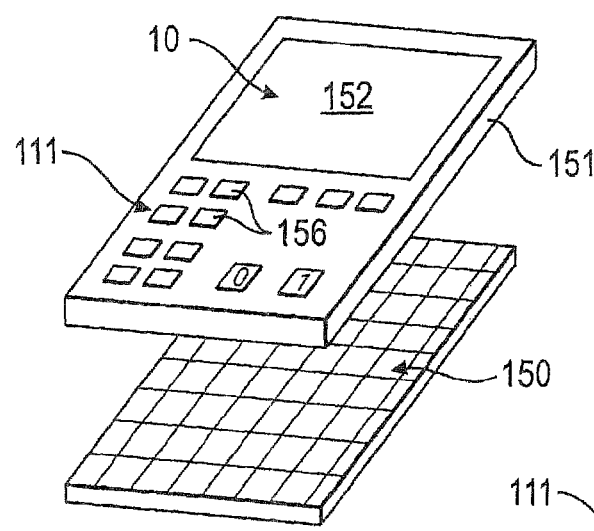
Fig. 12
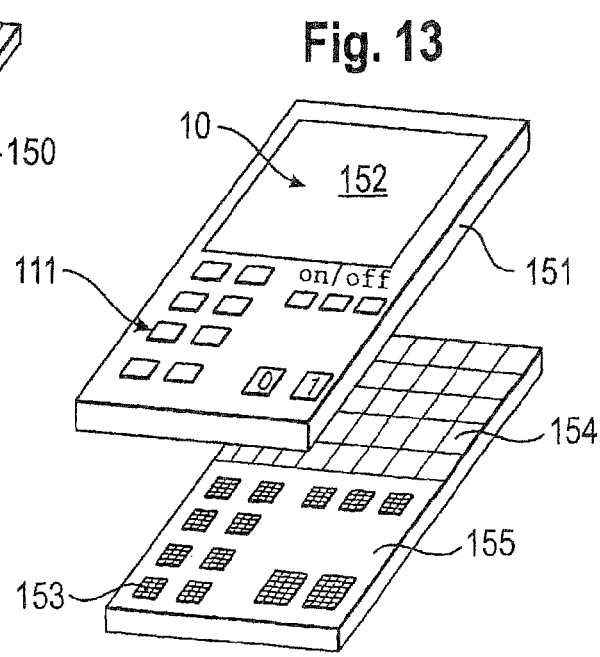
Fig. 13

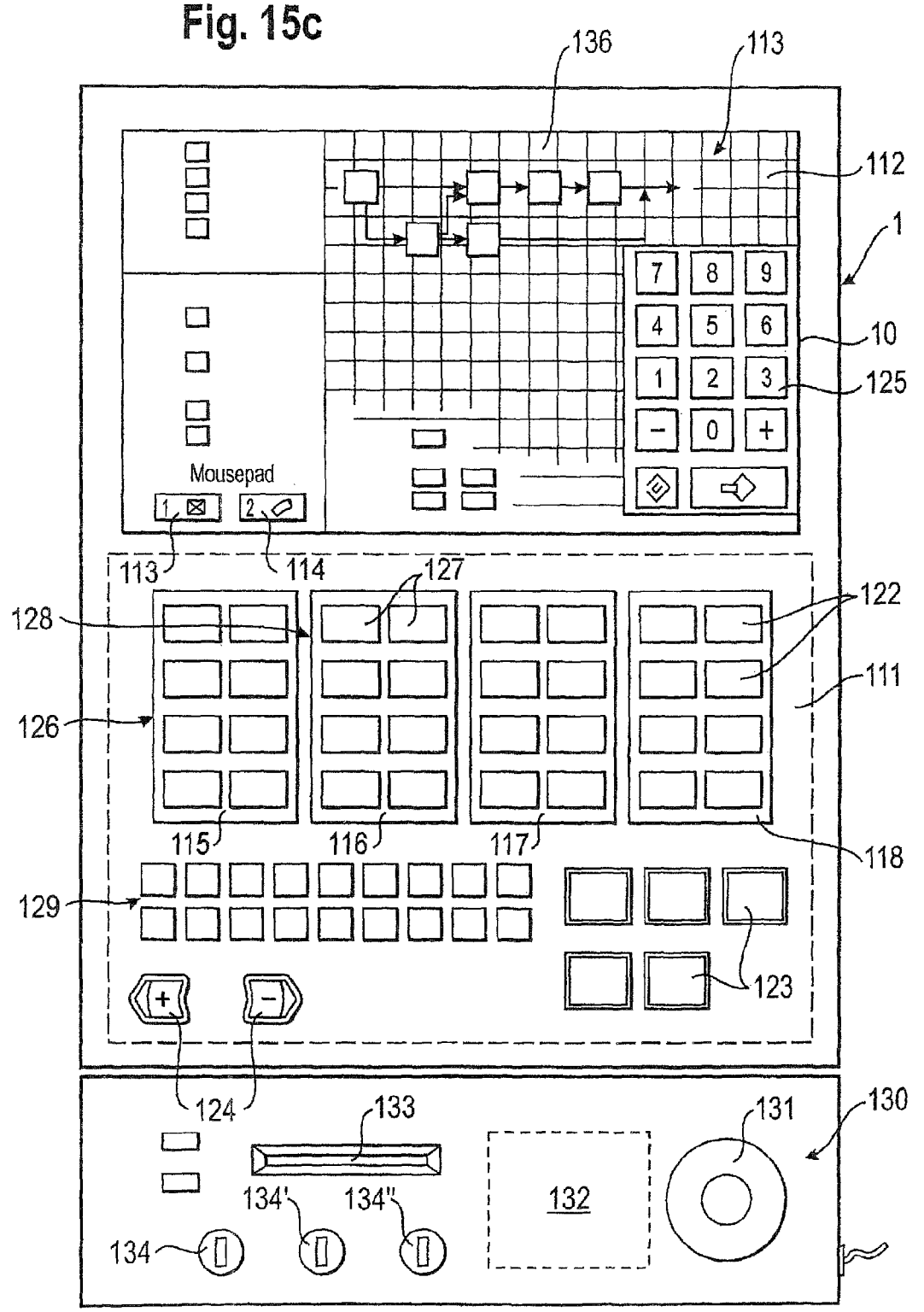

CONTROL UNIT WITH TOUCHSCREEN KEYS

CROSS-REFERENCES TO RELATED APPLICATIONS

This application is the U.S. National Stage of International Application No. PCT/EP2007/063629, filed Dec. 10, 2007, which designated the United States and has been published as International Publication No. WO 2008/071669 and which claims the priorities of Swiss Patent Applications, Serial Nos. 02027/06, filed Dec. 13, 2006, and 01034/07, filed Jun. 27, 2007, pursuant to 35 U.S.C. 119(a)-(d).

TECHNICAL FIELD

The invention relates to a method for controlling one or several machines, or a production cell, having repeatable process sequences with a machine controller and a control unit, configured as a man-machine-interface (MMI), wherein parameterization of the production and the configuration of the production sequence can be inputted and changed by way of keys, while viewing the control unit or a main display screen, and the operative control inputs can be inputted and changed with machine movement keys, while viewing the machine.

The invention also relates to a controller for one or several machines or a production cell, with repeatable process sequences via a machine controller as well as a control unit, configured as a man-machine-interface (MMI), wherein parameterization of the production and configuration of the production process can be inputted and changed with a first control field and the operative control inputs can be inputted and changed with machine movement keys of a second control field.

STATE-OF-THE-ART

Control of machines and systems, in particular of a production cell with cyclically repeatable process sequences for the production of mass-produced parts, has a large number of basic requirements:

In general, a machine controller with a stored-program control (SPS) or with an industrial PC (IPC), including commercial desktop or laptop PCs, is used. The control elements, except for the display screen and the PC, are installed in a control cabinet. Also housed in the control cabinet are a converter for controlling individual controllers as well as high-performance processor cards for the major axes of the machine and all electrical/electronic subsystems and main switches for supplying power.

Newer machines, in particular injection molding or die casting machines, also include subsystems, such as supply and discharge, unloading robots, post-chillers, etc.

For repeatable process sequences, the operator must be able to define the process sequence, input and change the production parameters, wherein a separate control unit is used in practical applications.

The control unit has multiple functionality and is referred to as man-machine-interface, in short MMI, and may include dedicated computers and storage devices, also user-accessible interfaces for connection of additional devices, such as USB hard disks, USB drives or USB flash storage devices.

An essential component of the MMI is a display screen, on which the components of the machine, its process sequences as well as the process parameters are clearly displayed.

In the following preferred example, reference is made to the field of injection molding machines. The control of injection molding machines has another important basic requirement, namely unrestricted programmability of the configuration of the process sequence of an injection molding process. An injection molding machine is typically used to produce different injection-molded parts. A special injection mold must be employed for each different injection-molded part. Depending on the complexity of the injection-molded part, for example, one or several core pullers, additional ejection and removal tools and peripheral devices are required. As a result, the machine processes must be programmed anew for each new injection molding order. Programming and parameterization of the process sequence are typically performed via the control unit on the machine itself.

A conventional solution is described in EP 0 573 912. With the method for controlling a plastic injection molding machine, the operating parameters required for the process sequence of an injection molding cycle are typically inputted via an input unit into a data processing unit that stores these operating parameters in a form that guides the operator. When inputting parameters for setting up the injection mold, a selective selection of input options for the process sequence and configuration of the injection molding cycle is provided to the operator for a physically attainable process sequence based on the structure of the machine side and the mold side. The parameters required for setting up the injection molding machine can then be inputted faster and free of errors. After a first input for a complete injection molding cycle, one or several injection molding cycles are performed based on the stored operating parameters, and the settings are then optimized depending on the requirement for a subsequent automatic production of the injection-molded parts.

When a new injection mold is operated for the first time, the operator uses the operating mode "set up." The set-up person can here proceed step-by-step and accordingly program step-by-step parts of the process sequence with the required parameters and activate the movement sequences without the melt material. To this end, he must push the corresponding operative keys on a keypad of the control terminal, for example, with the function key "hold to run."

Programming inputs on the display screen, wherein the eye is always focused on the display screen: the input is performed with a pointing device, by which a mark on the display screen is moved, with the position of the mark determining the input. Feedback is provided visually on the display screen. The following pointing devices are known: cursor keys, mouse, trackball, touchscreen, touchpad, scroll wheel and joystick. A touchscreen display screen is currently widely used for applications that rely exclusively on display-screen-centric inputs. For more complex functions, such as drag-and-drop, moving elements, or selecting a number of elements from many, the mouse or the trackball are still unsurpassed. This applies to all programming tasks, navigation and system settings of injection molding machines. Programming inputs on the display screen are referred to as "controlling in the field of view." A touchscreen can be manipulated across the screen area and is therefore a controllable display screen.

Operative commands sent to the machine, wherein the eye is typically focused on a machine part: for this functionality, the known pointing devices cannot be used for obvious reasons. Input devices in form of machine movement keys in form of mechanical keys and rotary/handle switches with two activation directions are to this day predominantly used for injection molding machines.

FIG. 1 shows a conventional control unit 1 manufactured by the applicant. The top sector shows a top control field 2 with a large number of mechanical keys or machine movement keys 3, with the function of each key associated with a fixedly assigned symbol for operative intervention. The middle sector is a display screen 4 with a status display for individual components of the machine and for actual states of the process parameters. Any number of representations, schemes and process sequences can be called up and displayed on the display screen 4. The call is made by corresponding keys located on the bottom control field or the keypad 5, but can also be made in the top field. The bottom sector of FIG. 1 shows the control field 5 for inputting parameter values using conventional mechanical keys. The keypad 5 can be flipped open and shut or pushed in along a horizontal axis 7 (arrow 8), to prevent it from protruding when not in use. The individual input keys 6 can then be operated with one's fingers, in analogy to a typewriter keyboard. The entire control unit is designed by considering ergonometric functions, wherein its height of the entire unit can be adjusted with a handle 9. The display screen 4 should be placed approximately at eye-level depending on the height of the respective operator, and the control field 5 with the mechanical keys should be placed to a comparable position and height for manual input; alternatively, the display screen can be tilted for ergonometric reasons.

WO 01/96969 shows another conventional solution for a control unit of an injection molding machine. It discloses a touchscreen, with mechanical keys arranged around the outside of the touchscreen and divided into regions AE. The symbols are illustrated on the marginal edge of the display screen. This solution is suitable when changing the visualization for different situations. This type of control is an improvement over the aforedescribed solutions, because a lesser number of keys is needed. The actual operation is performed on the touchscreen. Two additional rows of mechanical keys are arranged below the display screen. Disadvantageously, conventional mechanical keys have a dedicated use. Each key has a label which describes its purpose. Because this label is fixed, the key can only be used for a single function.

It is therefore an object of the invention to search for solutions which obviate the aforedescribed disadvantages, but which satisfy all basic requirements for a man-machine-interface (MMI):

Operation with view onto the display screen,
Operation with view onto the machine, in particular for the function "hold to run,"
Cost-effective basic solution for different machine types, and
Simple and convenient operation which can be learned quickly.

DESCRIPTION OF THE INVENTION

The method of the invention is characterized in that at least a portion of the operative control inputs for the machine movement is performed by haptic keys and/or tactile touchscreen keys applied on a display screen, which are visible and perceptible by touch, whose function can be programmed and which each have an associated display screen or symbol field.

The device of the invention is characterized in that at least a portion of the machine movement keys is formed by haptic keys whose function can be programmed and which are applied on a display screen, and/or tactile touch screen keys which can be viewed and sensed by way of the edges, with each key having a corresponding, directly associated display screen and symbol field and being arranged on the area of a display screen.

Tactile perception is referred to as a component of the haptic perception of living beings. This is also referred to as tactile surface sensibility. The best-known example for tactile perception is Braille script and sensing a curb with a cane. It is a perception of other bodies through touch. Haptic identification makes use of an additional form of sensual perception, which is located in the dermis, in particular on the hand or finger of the human being. This refers to sensing a reaction of the touched key, for example through pressure, vibration or heat. The touched body does not provide a response with tactile perception. This is unlike haptic perception, where active touching is acknowledged, in the sense that an intervention is actually recognized and performed.

The inventors have recognized that, although more advanced means have recently been used, these advanced means still have basic disadvantages. For certain functions, the touchscreen has been successfully employed as an optimal practical solution. However, it is problematic to move components in a machine with input provided on a touch-screen. The operator has no other guidance except for the mere contact between the finger and the screen surface. There is a risk that the finger may slip off, in particular when the operator looks on the machine rather than on the display screen. The finger is not guided, unlike with, for example, a conventional mechanical key. Conversely, the novel invention proposes to provide the key itself with an important feature, in particular a guiding function for the finger. This is attained by configuring the key as a haptic or tactile key. In the tactile embodiment, the operator senses, for example due to edges around the key, that his finger is actually placed on the key, and he always senses the edge when slipping off. In a haptic embodiment, he senses a kind of depth effect when operating the key, for example when operating a clicker key. He senses or hears the clicking sound. In addition, the key attains a higher functional level as a result of its programmability.

According to the second core concepts of the novel invention, a display screen field is associated with the machine movement key and/or the machine movement keys are arranged in the area of the display screen itself. The operator is now guided by the image and the key exactly to the function or movement to be activated. This is neither the case with a conventional touchscreen nor with mechanical keys.

Preferably, the machine movement keys are programmed using the display screen field directly associated with the individual keys and activated depending on the situation. For tactile touchscreen keys that are visible and perceptible by touch, the respective associated display screen field is programmed and visualized in the area of the key surface itself. For haptic keys, a display screen field in the region around the key is programmed and visualized for each key.

With novel solution, the control is concentrated in two intelligently configured control fields, based on data exchange in both directions. The haptic keys can be arranged in a display screen area itself. The first control field is configured for the display screen-related inputs, whereas the second control field is configured for the machine-related inputs with view onto the machine. Stored software can automatically activate corresponding input locations on the second control field for the display screen configuration.

Another advantageous embodiment of the method of the invention is characterized in that for the haptic solution, the second control field is used according to the Windows principle, for example simultaneously or sequentially for controlling the machine process sequences or as auxiliary computer for processing text and numbers. The membrane keys applied on the display screen are arranged on the display screen with a corresponding associated symbol field for each key, wherein the symbol field can be activated from the first control field and the operator provides input and control commands with the membrane keys of the second control field. However, the keys of the second control field can also be activated by input locations of the second control field.

The novel solution enables various surprisingly advantageous embodiments which will be described in detail below:
- The operator senses the machine movement key. Depending on the configuration, he receives a "feedback" through vibration from the key itself, or through the typical clicking effect with a clicker key, also
- The possibility of a clearly arranged association of the functions for both control fields,
- A logical separation between the programming task on the display screen and the operative intervention on the machine. While performing tasks on the display screen, the eye remains focused on the display screen. For the operative intervention, the second control field can be configured for blind operation.
- The possibility to significant reduce the number of intervention sites for the second control field, so that it can be made smaller and simpler, and
- The possibility of a simple remote control with a mobile handheld control device, because this device now requires only a minimum number of keys.

The novel solution allows to different embodiments, in particular for the second control field. In both cases, the area of the control field is used for arranging the machine movement keys. In both embodiments the second control field can be programmed and used for displaying different symbols.
- The first solution approach is primarily based on haptic sensors of humans;
- The second solution approach is primarily based on tactile sensors of humans.

According to the first solution approach, haptic keys, for example membrane keys, in particular clicker keys, short stroke keys, silicone keys, piezo switches, capacitive switches, etc., are preferably used in the second control field.

According to the second solution approach, preferably tactile keys, in particular touchscreen keys that are visible and perceptible by touch, are used in the second control field, for example keys with edges around each key that are perceptible by touch.

The two solution approaches, however, can also be used in any combination.

According to another embodiment, programming of the process sequence for the function of all components of the machine or device is performed on the first control field, whereas a portion of the input locations on the second control field are used multiple times, with corresponding programming and display at the input locations. The operator does not notice while programming the process sequence and during a parameterization that the functions of the input locations for the operative interventions with respect to the individual components are prepared in the background, so that the input locations required for parameterization of the individual components and/or for the components to be operatively affected are automatically activated when the component is called up on the display screen. The totality of the information, including the actual process sequences, required either for setting up a tool or for the operative interventions, for example, for optimizing the process parameters, are displayed to the operator, providing logical and secure operative access with the smallest possible number of input locations.

In a particularly preferred embodiment, the machine movement keys are programmed with the symbol associated with the respective key and flexibly used, so that only a reduced number of machine movement keys are activated commensurate with the selection of the production means and/or case-related and/or depending on the operating mode. Although the operator has a greater number of machine movement keys, only those keys are displayed that are used for the actual intervention, preferably by illumination or highlighted with different colors or brightness. The second control field is preferably in data exchange from and to the first control field, wherein the function of at least a portion of the input locations or own the machine movement keys of the second control field is defined by the programming on the first control field. The keys required on the second control field for the components that will be operatively affected are automatically activated with the associated symbol when addressing a concrete component on the display screen with the stored programs. The operator can provide inputs for programming and parameterization of the process sequence on the first control field with a trackball while viewing the control unit, and can operatively intervene on the second control field of the machine with haptic keys and/or touchscreen keys that are visible and perceptible by touch, wherein the first and second control field are in functional connection in both directions. With this solution, a portion of the machine movement keys with the associated symbols can advantageously be flexibly used for different components and functional connections. At least a portion of the machine movement keys can be discrete sectors, allowing two of more of the corresponding keys to be operated simultaneously.

In the operating mode "set-up", the production sequence is configured with view onto the display screen in the region of the first control field, whereas the parameterization and input of control commands for the actual movement of the components of the production cell is performed via haptic keys in the area of the second control field. In the operating mode (automatic operation), operative inputs and control commands are performed on the second control field, while operative inputs are performed via the keypad with trackball in the region of the first control field, wherein corresponding corrections of operating parameters in the first control field are displayed on the display screen and inputted into the storage device. The physical variables or parameters, e.g., velocity (V), pressure (P), force (F) and distance (S) can be inputted via the "+" (Plus) keys and "−" keys, respectively, and increased or decreased. In a particularly preferred embodiment, the second control field is at least partially configured on the display screen in form of sectors, in which the symbols are programmed and displayed on the display screen together with the symbol fields associated with the corresponding haptic keys and/or the symbols are programmed and displayed on the display screen keys that are visible and perceptible by touch.

The symbol fields or symbols are used as display screen for status displays and/or for displaying conventional technical symbols, in particular injection molding symbols and/or for displaying colors, e.g., red green and yellow, and/or for static or dynamic display and/or bar diagrams and/or for graphic visualization of states. A particularly preferred field of application for the novel solution is injection molding machines or die casting machines as part of a production cell for the cyclical production of injection-molded parts or die-cast parts. The production process sequence and all operating parameters required for the production process are configured and inputted on control unit in the region of the first control field with a data processing unit storing the operating parameters, and the operative operating parameters are inputted and changed from the second control field in a prepared mask of the first control field. This leads to a distinct logical separation of the two control fields. The second operative control field does not allow changes to the process sequence, because changes to the process sequence have a completely different background which is evident to the set-up person. The user in his function as "operator" does not have this knowledge. For this reason, he does not have access to corresponding inputs for the process sequence. Erroneous inputs to the process sequence cannot only cause interruptions in the operation, but can also damage the molds and the machine. Erroneous input of parameters is not a problem, because a background programming mode defines an upper and a lower limit for each parameter.

According to another preferred embodiment, the second control field is divided into haptic keys and programmable symbol fields associated with the haptic keys, wherein the operator can use the suitably programmed second control field as auxiliary computer with at least a portion of the haptic keys as input keypad, particularly also according to the international Querty or Quertz or (France) Azerty scheme and the symbol fields as display screens for processing text and numbers. This function was not available with conventional embodiments, because the second control field was not configured as display screen or as display screen aid consisting of one or several display screens. Advantageously, the second control field is used according to the Windows principle for simultaneously or sequentially controlling the machine process sequences or as auxiliary computer for processing text and numbers.

The keys are normally mechanical keys, which are typically actuated by pressing down with a finger. A corresponding switching function is typically triggered when using electrical devices. A large number of embodiments are feasible, for example pushbutton keys, toggle switches, sliders, symbolized or virtual keys on the display screen. Control field refers here to the front surface of a control box, which is typically arranged near the main inputs on the machine itself and is used for direct operation. Conversely, the much larger control cabinet is located mostly next to the machine, frequently also on a wall.

As described above, according to the novel solution only a limited number of membrane keys may be physically predefined. With program-supported symbol representations on the display screen and corresponding functional connections, the same membrane keys can be freely programmed for controlling other components and functional connections, and used in different ways. The arbitrary use, however, has limits because the operator prefers to have the corresponding keys for the most important machine movements always at the same location. In this way, he can continue to use his own automatism.

As far as the device is concerned, the control unit is configured as programmable soft-keyboard, wherein the machine movement keys for the operative intervention can be programmed with the associated symbols of the second control field, such that the machine movement keys of the second control field with the associated symbols can be activated via the first or via the second control field. The machine movement keys are programmed with the symbol associated with the respective key and used flexibly, such that only a reduced number of a machine movement keys can be activated depending on the selection of the production means and/or case-related and/or depending on the operating mode. The association of the individual haptic keys with the respective symbol field should be unambiguous through corresponding identification. With today's "best mode", the haptic keys can be applied in form of a strip on a display screen, with respective associated strip-like symbol fields, wherein alternatingly strips for haptic keys and symbol fields or individual display screens as symbol fields are arranged between the key strips on the display screen area. The strips can be arranged horizontally, vertically or in a combination thereof. The symbol can then be located below, above or on the side of the associated key. Alternatively, the arrangement can be entirely different, for example in form of a checkerboard pattern. According to another possible embodiment, static images or sequences of image sequences or video sequences may be added on or next to the keys. The shape and size of the keys can be arbitrarily defined. The same applies to the symbol fields. Individual symbol fields can also be implemented as miniature display screens which can be used for several keys.

According to another advantageous embodiment, the man-machine-interface is modular and has at least two regions or control fields. The two control fields can be configured as a dual-mode display screen or by using two separate display screens. Preferably, the man-machine-interface has at least two base modules, a display screen base module and a keypad base module. The display screen base module includes a manually operated module and a display screen module for configuration and a parameterization of the process sequence. In another possible embodiment, a USB controller module is associated with the man-machine-interface, wherein the man-machine-interface includes several modules which are mounted on a support console. The USB controller module can be arranged in the support console itself.

Advantageously, an input mask may be displayed on the display screen of the first control field, such that the process sequence and the parameterization can be configured and parameterized on the user interface of the first control field. The input mask has, in particular, a field for visualizing the process sequence, a list of the controllable machine components with selectable commands as well as a parameterizing field. The required membrane keys with the corresponding required functional connections for the membrane keys are automatically switched on and activated by selecting a component scheme or the parameter displays on the display screen for the input locations of the first control field. The operator is thereby directly guided to see his options for influencing the process.

In a particularly advantageous embodiment, the machine movement keys have multiple functions, in particular:
An illuminated display as a status display
Display of a symbol and/or text indicating the functions to be activated by the keys and/or significance of the key function,
As a control input and control command for activating machine process sequences and/or changing production parameters.

For example, if the operator has called the component injection molding machine on the display screen of the first or second control field and wishes to command a movement, then he cannot accidentally press in the second control field an input key for closing the mold, because this command is not available in this situation. According to another embodiment, the first and second control fields are arranged on separate display screens. In a particularly advantageous embodiment, the input locations of the membrane keys of the second control field are arranged on at least two or more display screens. In another particularly advantageous solution approach, the first and second control field or, duplicated at least in partial function, is implemented as a mobile handheld control device. This proposal satisfies a long felt need. The core problem of a mobile handheld control device is, on one hand, the limited user interface and also the question which options for intervention make sense for a mobile handheld control device. The novel invention forms the basis therefor.

Because according to the novel solution
a) Data exchange takes place in both directions,
b) The number of active input locations for operative intervention is kept as small as possible, and
c) Parameterization is a display screen-related operation,
all frequently used operative commands can be implemented with a limited number of input locations. Preferably, the second control field is stationary. The operation of the mobile handheld control device can be blocked and/or the stationary second control field can be blocked when operating via the mobile handheld device. The mobile handheld control device can be implemented, for example, as a mobile phone with a display screen, or as a PDA or as a Smartphone or laptop, wherein data exchange can via wire or wireless or via radio waves or IR or IrDA or Bluetooth or wireless USB or WLAN BIG. With data exchange in both directions, for example, a component scheme or a functional process sequence of the injection molding process can be called up on the small display screen of the mobile handheld display device, and the required operative commands inputted. All safety requirements in the controller are fully retained, because the commands of the mobile handheld control device are routed via the control unit.

According to another embodiment, the control unit has an additional box, in particular for reader locations and/or safety switches and/or for additional interfaces, such as a touchpad on a laptop and/or another electronic control device with remote control and/or an emergency off-switch.

The tactile solution approach is characterized in that the operator performs the inputs and control commands on the control unit with at least one first and one second control field on a display screen, wherein the operator performs a portion of the input with view onto the display screen and the other portion of the input with view on the production machine by using touchscreen keys that are visible and perceptible by touch, supported in the region of a second control field.

The control unit of the invention according to the tactile solution approach is characterized in that the control unit has at least a first and a second control field on a display screen, and the second control field has touchscreen input locations that are visible and perceptible by touch.

According to another particularly preferred embodiment, a portion of the inputs is performed with view onto the display screen via input locations in the region of the first control field and another portion of the inputs, in particular the operative inputs, are performed in the region of the second control field with view onto the machine via touchscreen locations that are visible and perceptible by touch. Advantageously, the portion of the inputs with view onto the display screen is also performed via touchscreen input locations. A touchscreen has the significant advantage that inputs can be made on the display screen itself at the locations marked for the corresponding functions. The novel solution also enables use the touchscreen in a reverse configuration, by displaying the corresponding function at the input location. In addition, if the touchscreen locations in the region of the second control field are rendered not only visible, but also perceptible by touch through corresponding shaping, for example by protruding marginal edges, then the operations can be more quickly learned. In the startup phase, the operator can confirm with one glimpse that he put the finger onto the correct input location. He will then later master the operation much like touch-typing on a typewriter.

As already described above, according to the novel solution, a limited number of touchscreen locations or keys that are visible and perceptible by touch are advantageously physically predefined. With program-supported symbol representations on the touchscreen locations or keys and corresponding functional connections, the same touchscreen locations or keys can be freely and differently used for controlling other components and functional connections. As a result, the second control field has a limited, relatively small number of input locations. A portion of the input locations of the second control field can be used with corresponding programming instructions for different functions and/or several times. The corresponding activated function is automatically displayed at the input locations of the second control field.

In a particularly advantageous embodiment of the control unit, the touchscreen input locations are programmed in the first control field in relation to their coordinates, and the touchscreen input locations of the second control field are programmed in relation to the sectors. The input locations in the first control field are image-related and their coordinates must therefore be programmed commensurate with the image. The situation is different for the second operative control field. A number of spatially fixed input locations exist which must, however, be individually programmed for each changing function. To this end, the touchscreen function includes software which can be used to automatically display and illuminate the activatable touchscreen input locations or haptic keys that are visible and perceptible by touch with the corresponding symbols. A tactile feedback is associated with the touchscreen input locations for sensory acknowledgment that a control command was actually inputted and accepted, wherein the tactile feedback can be associated with individual keys, individual control fields or with an entire input unit.

The novel invention offers quite different embodiments for the display screen. For example, the touchscreen fields can be arranged inside a display screen area and the touchscreen input locations that are visible and perceptible by touch can be formed by applying a structured mask. The mask can extend over the entire display screen area, wherein at least a portion of the touchscreen field can be configured for the visible touchscreen input locations as an uncovered window or as a transparent layer. The mask may also extend only over the second control field and may have openings in the region of the individual keys that are formed by stamping and/or by a transparent sheet. The open area about the touch surface can include embossed features, such as edges or raised portions or corresponding printed features.

According to a second conceptual embodiment, the first and the second control fields are arranged on separate display screens. Advantageously, the touchscreen input locations of the second control field are arranged on at least two or more display screens or on a dedicated display screen for each touchscreen input location. In this way, as discussed above, the display screen can be configured so that the touchscreen input locations of the second control field are programmed as sectors. The controller recognizes which input location was actuated, so that the command is properly processed. According to another conceptual embodiment, the machine movement keys can be either
    Glued on as strips or
    Embedded as strips or
    Glued on as membrane keys.

BRIEF DESCRIPTION OF THE INVENTION

The invention will now be described in more detail with reference to several exemplary embodiments.

FIG. 6 shows the display screen of the second control field as a filter pane made of acrylic glass (Plexiglas) before application of the haptic membrane key strips;

FIG. 7a show schematically a section of the display screen with applied haptic membrane key strips;

FIG. 7b shows a section VII-VII of FIG. 7a with glued-on haptic membrane key strips as first embodiment;

FIG. 7c shows a section VII-VII of FIG. 7a with embedded haptic membrane key strips as second embodiment;

FIGS. 9a-9c show different control units in modular construction;

FIGS. 11a-11c show three examples of concrete display screen sizes with the arrangement of the first and the second display screen with tactile keys;

FIG. 12 shows an exploded schematic view of the user interface with the first and the second tactile control field on a single display screen;

FIG. 13 shows an exploded schematic view of the user interface with the first and the second tactile control field with two display screens;

FIG. 15c is identical to FIG. 15b, with an additional control field of the tactile solution;

EMBODIMENTS AND IMPLEMENTATION OF THE INVENTION

Figure 1:
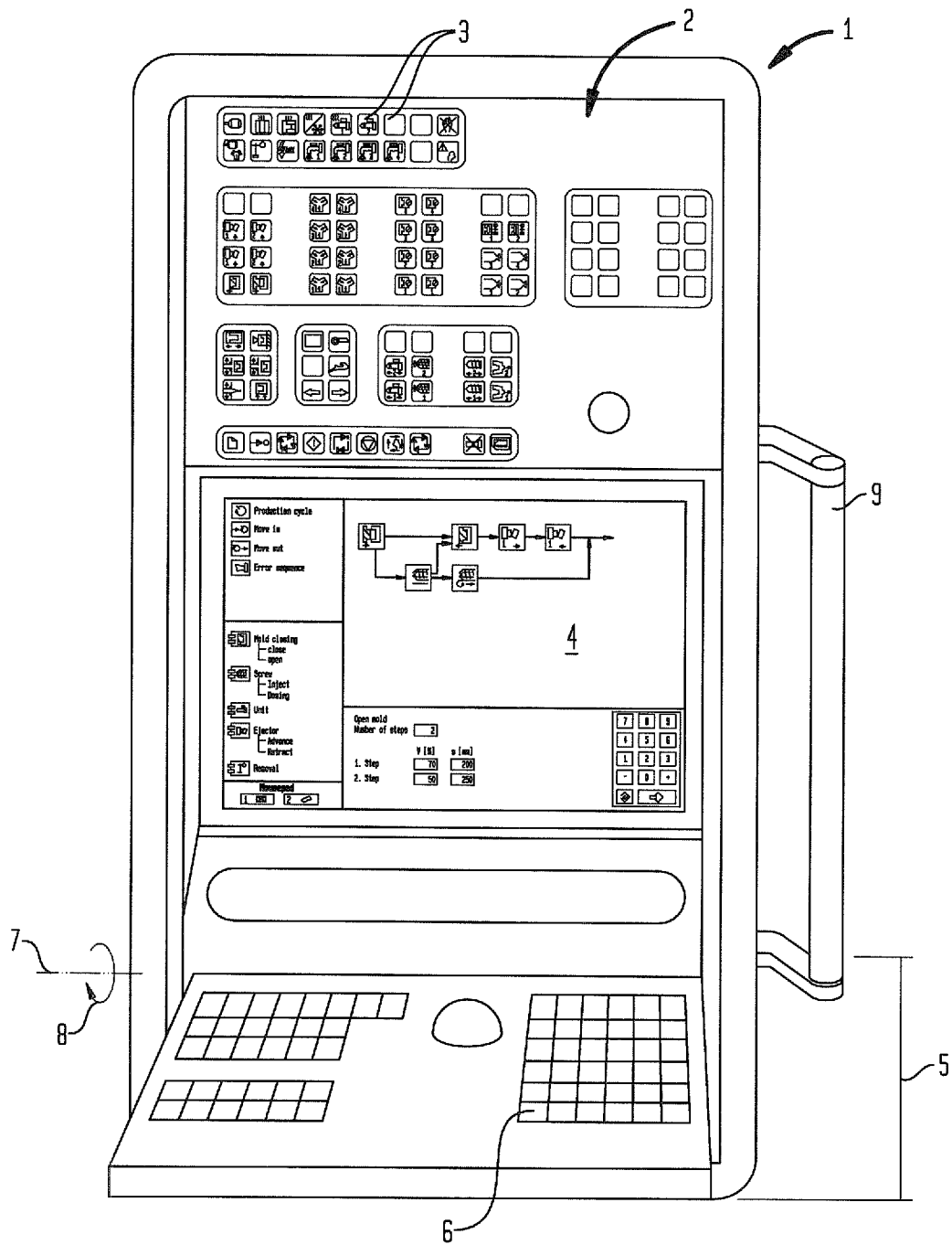
FIG. 1 shows a solution according to the state-of-the-art.

Reference will now be made to FIGS. 2a and 2b. In analogy to FIG. 1, which represents a solution according to the state of the art, FIG. 2a shows a control device 10, at the top with a second control field 2, in the center with a first control field 4, and at the bottom with a lowest control field or keypad 5. FIGS. 2a and 2b show clearly the modular construction, wherein each of the control fields 2, 4 and 5 represents a module. The keypad 5 can, as a conventional devices, have a keypad input 6 for inputting numerical values for parameterization (right), a trackball 11 (center) and direct jump keys 12. The display screen 13 is here controlled directly. The display screen 13 is implemented as a flat screen display 13. The process sequence and the parameterization can be set up directly on the display screen 13, for example according to FIG. 10. The control fields 2 and 4 and the keypad 5 are secured on a support console 14, whose angle can be pivotally adjusted about a pivoting linkage 15 with a retaining bracket 16. The support console 14 houses an additional module, namely the USB controller module 17.

The top module or the control field 2 has also a flat screen display and a keypad 19, respectively, on which alternatingly strips of haptic machine movement keys or membrane keys 22 as well as strips of display screen or symbol fields 23 are arranged. For example, in FIG. 2a, 6 membrane key strips 20 are arranged, with 6 corresponding display screen or symbol field strips 23 arranged above. In the horizontal direction, 14 membrane keys 22 are arranged on each strip and associated with each membrane key 22 14 corresponding display screen or symbol fields 23. As already mentioned above, the membrane keys 22 and the symbol fields 23 are in directed data exchange via the control computer and IPC of the controller and the two control fields.

Figure 3:
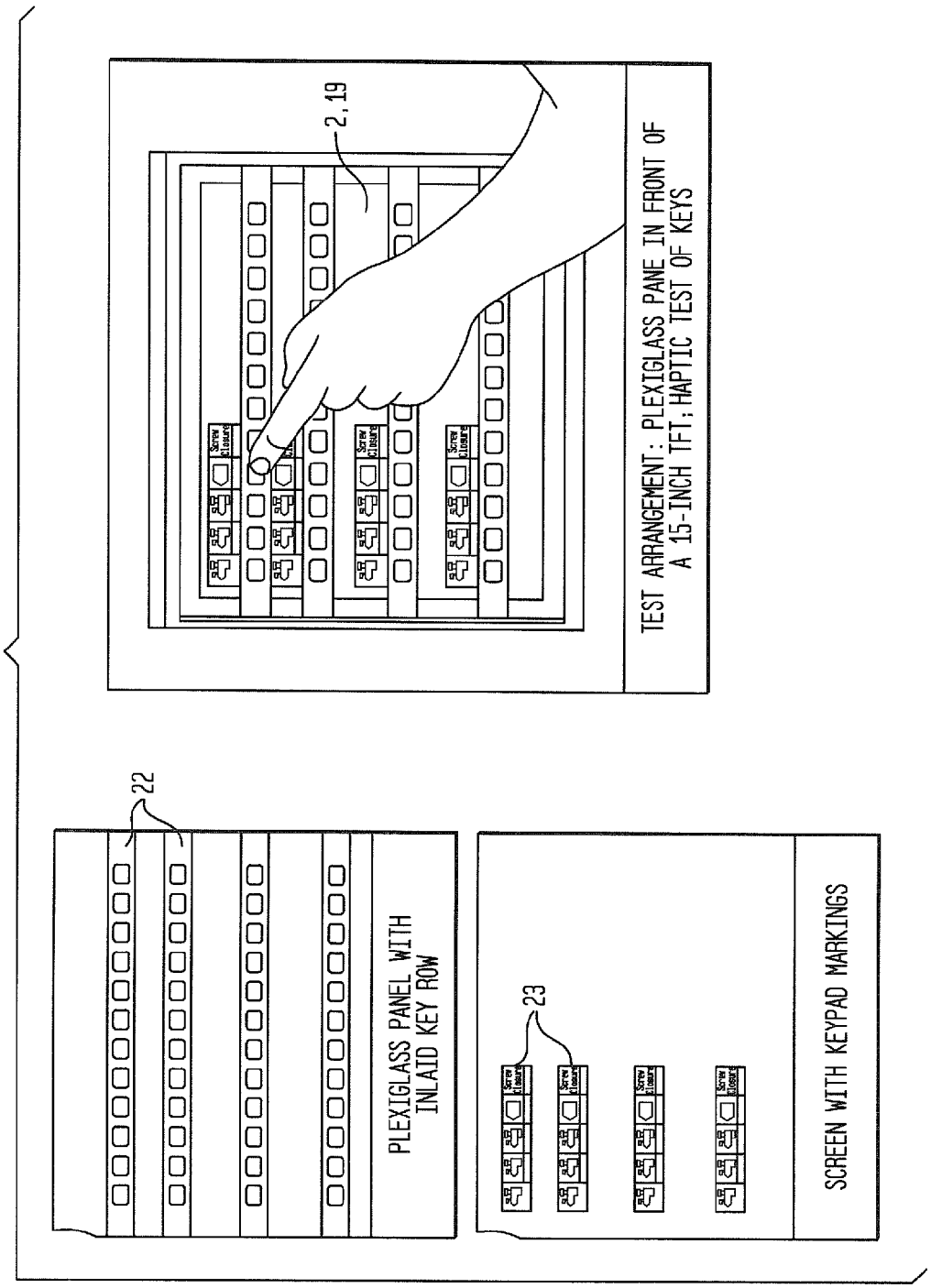
FIG. 3 shows the second of control field in three installation steps:
  Upper left: with membrane key strips applied on the display screen,
  lower left: the same display screen with symbol fields indicated on the display screen;
  right: the second control field with keys and symbol fields.

FIG. 3 shows schematically the structure of the second control field. In the left upper corner, a Plexiglas pane of is illustrated with haptic membrane keys 22 applied as strips. The same display screen or screen with the symbol fields 23 with key designations is shown underneath. The two functions configured as membrane keys 22 and the associated symbol fields 23 are illustrated on the right-hand side of FIG. 3 as picture diagram. Also illustrated is the manual actuation of a single membrane key, e.g. with the index finger.

Figure 4:
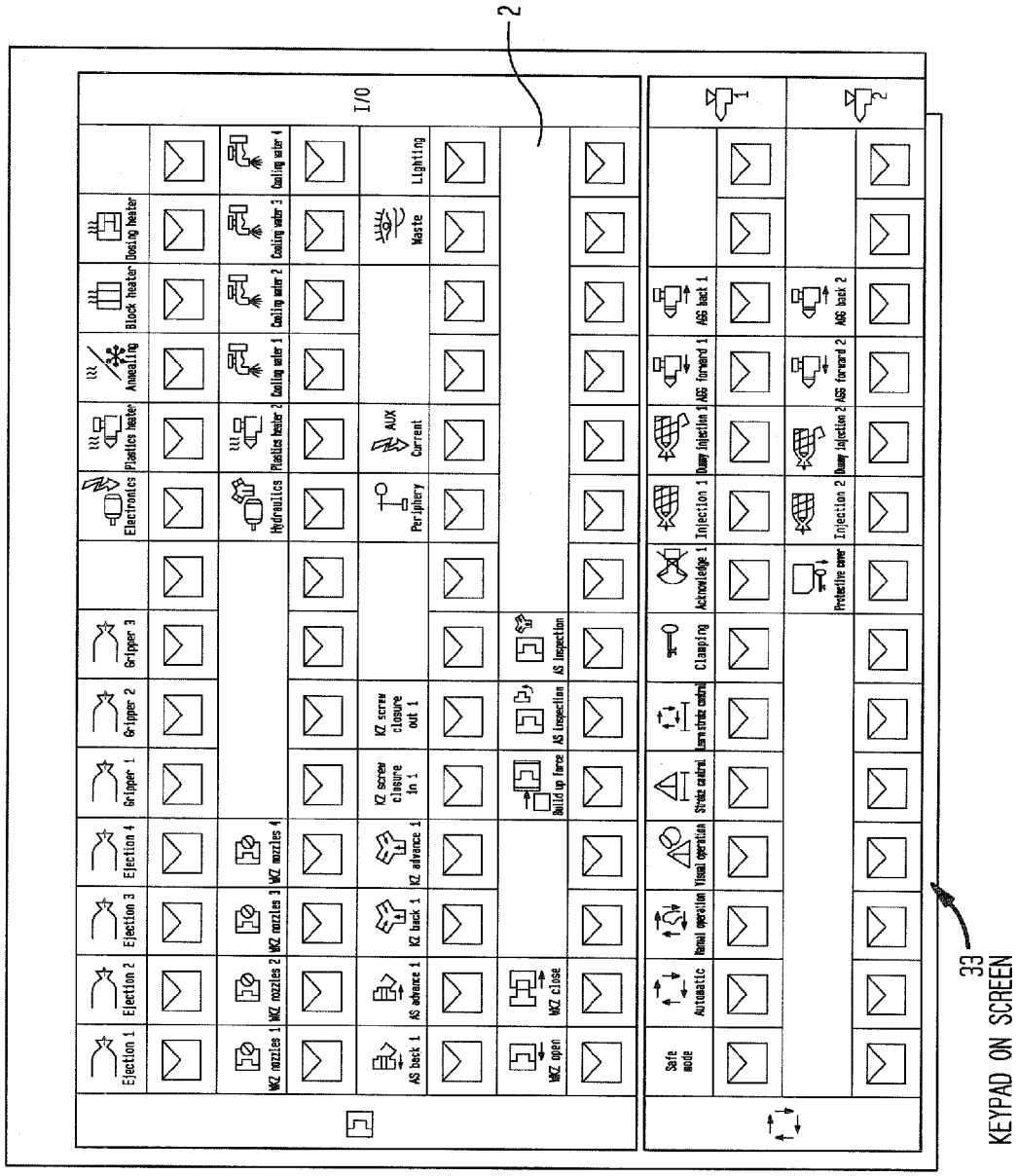
FIG. 4 shows a concrete application "dummy injection", activated on the second control field with haptic keys.

FIG. 4 shows an example of the second control field with the concrete application of "dummy injection" which was activated on this control field. The symbols represents classical symbols used in the field of injection molding. FIG. 4 shows clearly that only half of all display screen or symbol fields 23 are activated. All other fields were not used in the example "dummy injection." In any other application, for example "automatic injection," "area mold closing" or "mold unit side", other symbols are activated in accordance with the programming instructions. The requested action can then be provided to the injection molder visually via the associated symbol fields 23 using the least possible number of membrane keys 22 or symbol fields 23. The error rate is thereby minimized. In many applications, it is important that for instance two or more input locations can be operated simultaneously, which must be guaranteed with corresponding programming instructions. This control mode relates mainly to auxiliary controls, for example for core pullers, ejecting or blowing off the injection-molded parts. These input locations are arranged in the region of the blocks.

Figure 5:
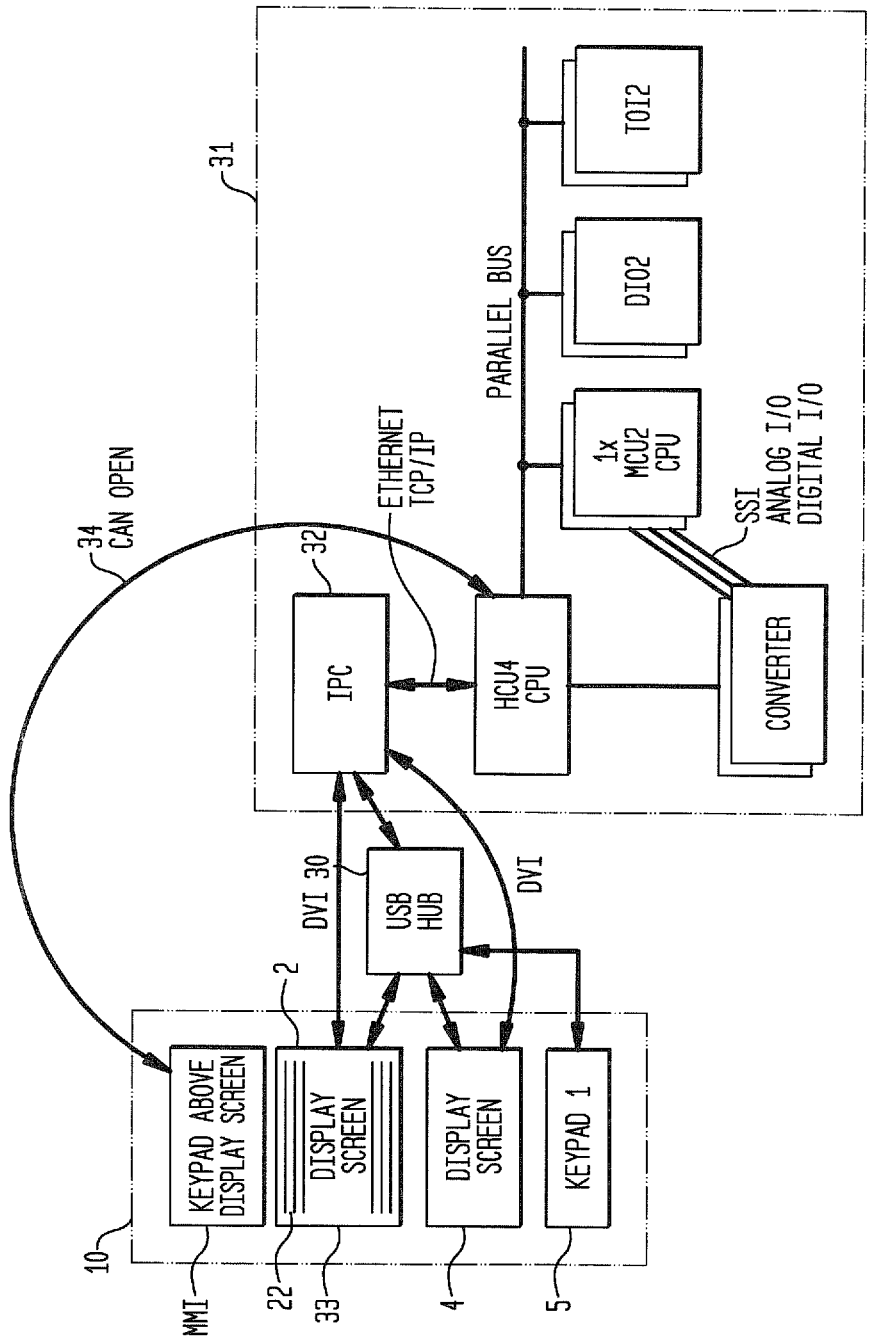
FIG. 5 shows schematically the data connections for the entire control of an injection molding machine.

FIG. 5 shows schematically an example for a complete control, for example for an injection molding machine or die casting machine. The left side of the Figure shows the control unit 10. The right side of the Figure depicts the electrical components which are housed in a control cabinet 31. The head of the controller is an industrial PC (IPC) 32, which is directly connected with a USB hub 30 and the two display screens 2 and 4 via DVI. The USB hub 30 is a separate module 17 which is connected, on one hand, with the control fields 2, 4 and 5 and, on the other hand, with the control cabinet 31.

FIG. 6 shows an exemplary layered construction of the front window 40 of a flat display screen 19 with the following structure—from top to bottom: hard coating 41, diffuse anti-reflection coating 42 of a thick Luxacryl plate 43, and a hard coating 44 at the bottom.

FIG. 7a shows as an exemplary detail of a membrane key strip 20 of a display screen with clicker keys 46, applied on the front window 40. The membrane key strips 20 are here glued on the front window 40 according to FIG. 7b and inlaid according to FIG. 7c. When the key strips are glued on, the transparent locations are raised with an additionally glued-on pane. A protective membrane 20' is glued above the foiled key strips and the glued-on panes, respectively.

Figure 8A:
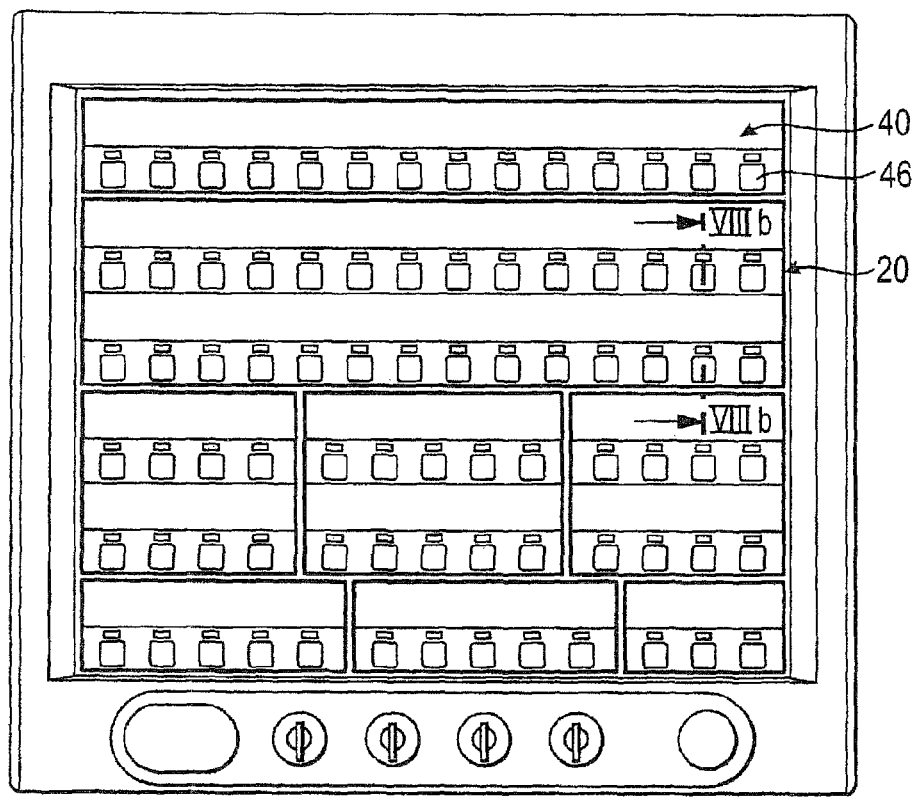
FIG. 8a shows an entire display screen with haptic membrane keypad with the clicker keys above the display screen.
Figure 8B:
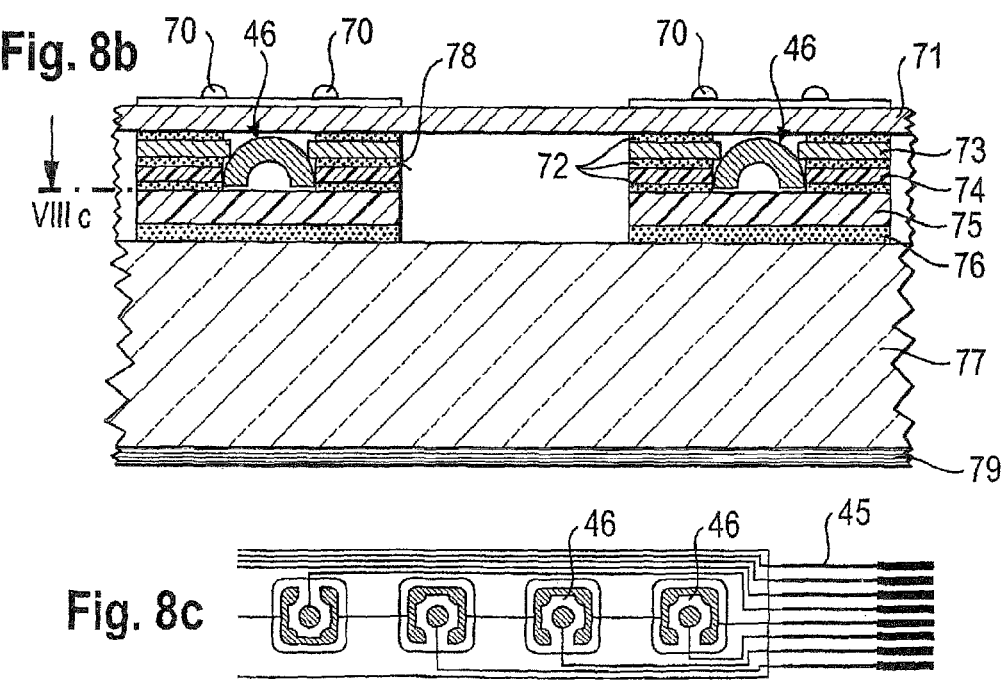
FIG. 8b shows a third embodiment of the haptic membrane keypad as cross-section VIII b.
Figure 8C:
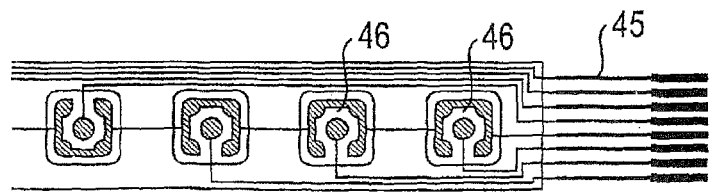
FIG. 8c shows the electronic printed circuit tracks for the individual clicker keys as section-cross VIII c.

FIGS. 8a, 8b and 8c show another particularly advantageous embodiment for the structure of the display screen with the machine movement keys. The keypad has the following structure: the uppermost plane is formed by embossed or printed areas 70 which in conjunction with the clicker keys produce a haptic/tactile function. The second layer is a cover membrane 71, followed by an adhesive layer 72, optimally by retaining rings 73, a retention membrane 74, a printed membrane 75 and a front adhesive 76. The entire structure is supported by a rigid glass pane 77, in particular a mineral glass pane. In FIG. 8b, the keypad support plate has transparent cutouts 78 for the display screen 79. FIGS. 8a, 8b and 8c show a novel manufacturing principle:

Use of a mineral-glass pane or a thick acrylic glass pane as a base unit
    High stiffness, High hardness, inexpensive.
A membrane keypad with clicker key elements is glued onto the glass pane.
    The membrane keypad with clicker key is arranged on a support plate.
A cover membrane with embossed marginal edge is pulled over the entire display screen area.
    In the visible area, there is only small distance from the membrane to the pane, and
    Has the highly chemical resistance of a membrane keypad.
    No dirt edges exist, because the user only touches a membrane plane (cover membrane).

FIG. 8c shows the printed circuit tracks 45, which are routed from the clicker key 46 to the controller.

FIGS. 9a, 9b and 9c show different assemblies 10, 10', 10" with additional modules.

Figure 10:
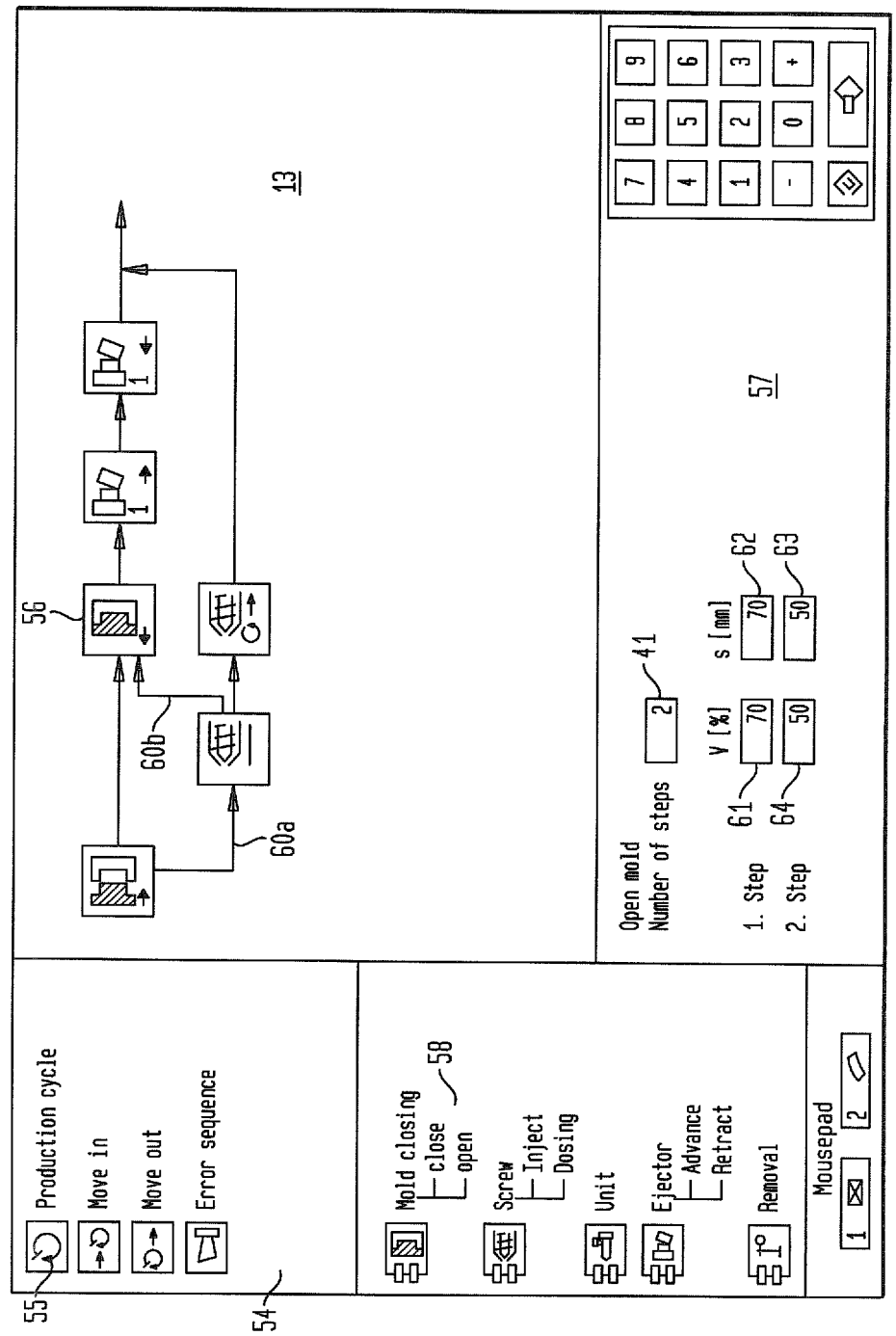
FIG. 10 shows the display screen of the first control field on an enlarged scale.

FIG. 10 shows an exemplary novel solution from the applicant for a particular display screen representation. This is a simplified illustration for a freely programmable process sequence of an injection molding cycle with input of the process parameters. Set-up and parameterization are performed on the display screen itself, while the user views the display screen 13. This is a virtual process generation, which does not yet directly affect the control sequence on the machine components. FIG. 10 shows on the display screen a process sequence monitor. The operation of the machine is very simplified when the machine sequence is visible to the operator, when the relevant information is clearly discernible on the display screen and can be changed when needed. The visualized machine process sequence based on the injection molding machine components, such as mold closure unit, ejector, etc., can then also be used as an organizing element for parameterizing the individual commands used to control the machine. The various commands, such as "close mold," "dosing" or "injection" can be directly set and offered for processing. An arbitrary process sequence, for example a production process, can be modeled with the process sequence editor shown in FIG. 10, and the employed components and commands can be parameterized. The process sequence editor or the process sequences are at the center of programming the injection molding machine. The entire parameterization of the injection molding machine including the associated peripheral devices, can be viewed and changed via the process sequence editor. This eliminates the conventional separation of the parameters over a number of input masks (screen pages).

The process sequence editor includes four areas:
    A list with all existing process sequences, process sequence list;
    A list of all physically existing components, component list;
    Graphic representation of the process sequence, process sequence visualization field 56, and
    Input mask for the parameterization of components and commands on the parameter field 57.

When an existing process sequence 55 is selected, the process sequence is graphically visualized in the process diagram field 56. The user can now change, rename, copy or delete the selected process sequence. To set up a new process sequence, the user can call the function "new" in the process sequence list 54. Those components can be selected from the list of the physically existing components—like a preselection—that are required for the new process sequence. To set up the actual process sequence, the user selects a command 58 for a component and adds this command to the process sequence 56. This is repeated until the process sequence is complete. When the user selects a command in the process sequence, the associated command parameters are displayed in the parameterizing field 57, where they can also be inputted. A command can be used in a process sequence several times. Each use (instance of the command) has then its own parameterization. Synchronizations 60a, 60b may be inserted in the process diagram field 56 and optionally parameterized. The commands inserted in the process sequence and the synchronizations can also be moved or deleted, or the associated parameterization can be changed. Many commands are symmetric in a cyclic process sequence, i.e., if one axis (for example, an ejector) is advanced, it must at another time also be retracted again.

Figure 2:
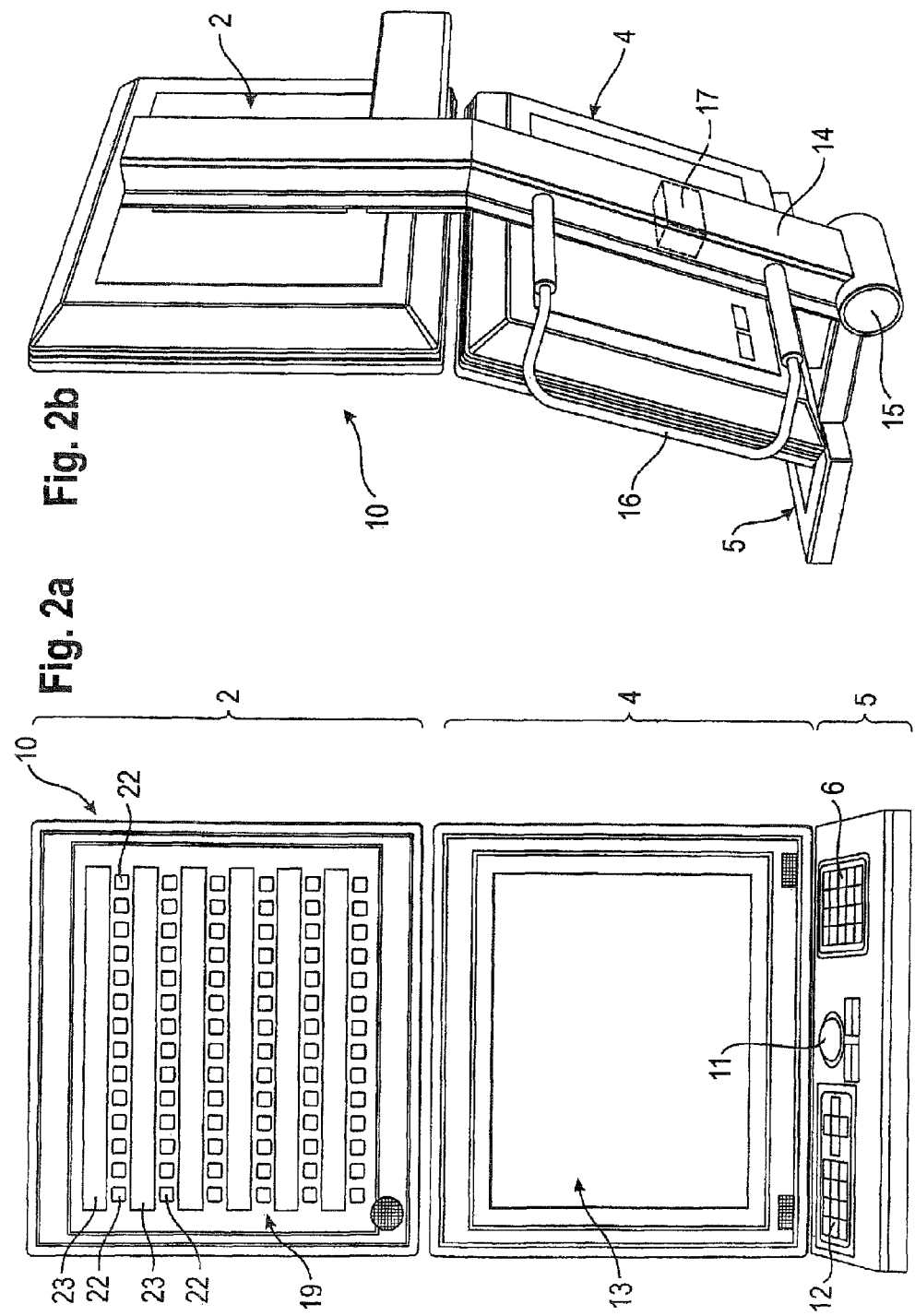
FIGS. 2a and 2b show a complete control unit according to the novel invention in a front and side view.

Existing process sequences can be used as a macro in other process sequences. For example, the existing process is inserted like a command as a macro in another process. The macro can also be expanded on the display screen to, for example, adapt the parameterization. Setting up a process sequence based on the existing components and their commands is not limited in any way. However, the user is alerted in the context of a plausibility check to potential errors in the process sequence. If, for example, the ejector is to be advanced when the mold is still closed, then this must be confirmed by the user. The parameterizing field 57 indicates via the input location how many stages take part in opening of the mold. The parameterization is indicated at the input locations 61 to 64, wherein the input locations 61, 64 indicate the velocity as percentage of a maximum velocity. The input locations 62 and 63 indicate the distance. The values can be changed, for example, via the numerical keypad 6 or via an input location +/− of the second control field (FIG. 2).

FIGS. 11a-c show schematically various possibilities for arranging the first and second control fields on a single display screen (FIGS. 11a and 11b) and on two separate display screens (FIG. 11c).

FIGS. 12 and 13 show two examples for the concrete configuration of the first and second control field 10 and 111, respectively, for tactile keys. FIG. 12 shows a solution with a display screen 150, with a touch membrane applied over its entire area. A mask 151 with a large upper window 152 is illustrated in an exploded view above the display screen 151. The window 152 is the first control field. The lower half of the mask 151 has separate tactile keys 153. The touchscreen must be programmable over the entire area with reference to coordinates, so that the input locations can be associated without error in both the first and in the second control field. The mask can be formed, for example, as a thin metal or plastic plate or as an embossed membrane. The windows 152 and the touch membrane located underneath then form an edge perceptible by touch. This edge also allows "blind" tactile sensing of the input location, much like a typewriter keyboard. Conversely, a raised edge or a raised embossed portion can be provided around the keys, as is known from mechanical keys. In the example of FIG. 12, the keys 156 cannot be operated simultaneously.

In FIG. 13, the second control field is configured with individual tactile keys as input location. The second control field can be programmed with respect to sectors. Each input location 157 is formed with a corresponding sensitive coating and a corresponding data connection with the first control field for data exchange in both directions. According to FIG. 13, the upper portion is a conventional touchscreen 154; the entire lower display screen 155 is configured as a single keypad only in sectors in the region of the input location. In the example of FIG. 13, two or more tactile keys 153 can be operated simultaneously.

Figure 14A:
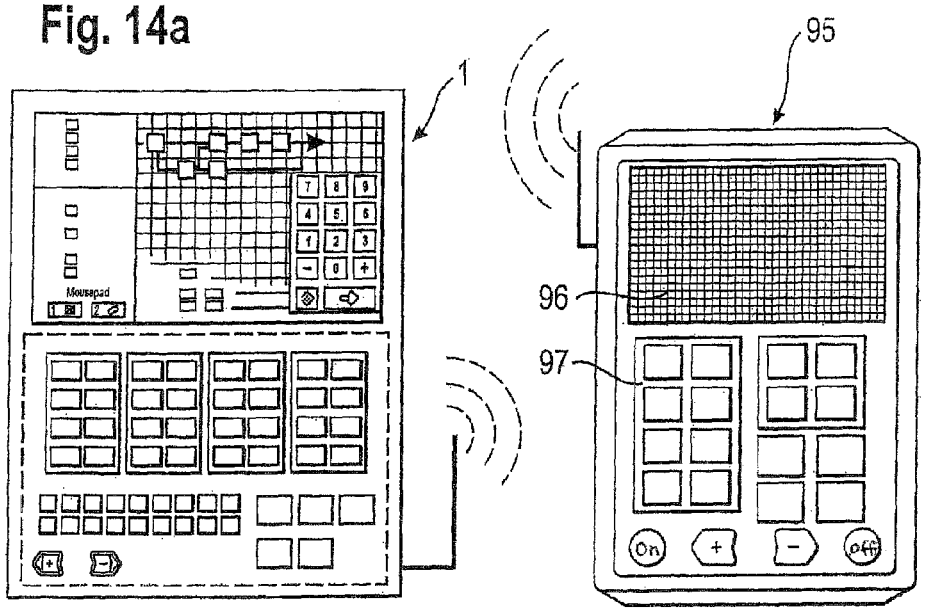
FIG. 14a shows the solution according to the invention with a handheld control device.
Figure 14B:
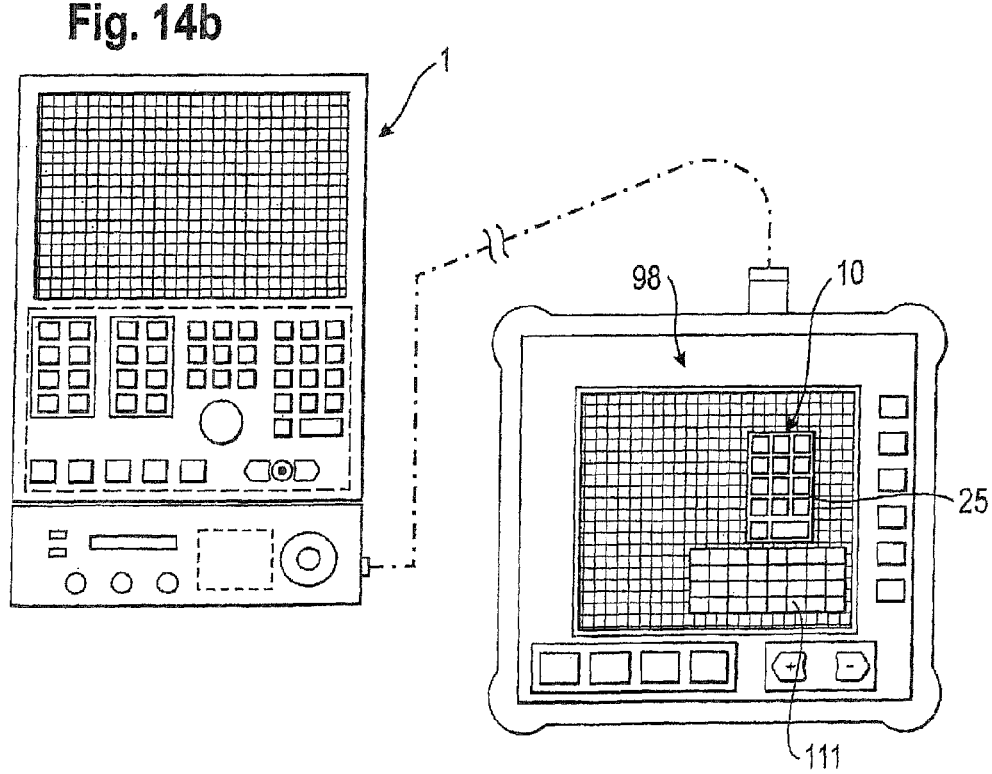
FIG. 14b shows the solution according to the invention with a portable laptop or notebook.

FIGS. 14a and 14b illustrate two possibilities for remote control. In FIG. 14a, a mobile handheld control device 95 is associated with the stationary control unit, wherein the control unit 95 is advantageously in bidirectional wireless data exchange with the stationary control unit. The mobile handheld control device has a small display screen 96. Both control fields of the handheld control device 95 are configured similar to the stationary user interface of the control unit 1. Programming of the process sequence would not be comfortable with the handheld control device, because the user interface is too small. However, the user interface is large enough for operative intervention on the machine. Advantageously, the handheld control device can also be brought close to the site where intervention is required. This primarily relates to movement commands. The user interface of the handheld control device can hence be simplified. The two operating devices can be mutually locked out for short times, thus preventing erroneous input.

FIG. 14b shows a combination of a stationary user interface with a handheld operating device in form of a laptop or notebook 98. Such device is difficult to hold by hand or to operate when standing up. However, it advantageously has a relatively large display screen. The laptop is particularly suited for process sequence programming, which can be performed close to the machine when seated. Setting up a new mold can also be facilitated with a laptop. The second control field of a laptop can be configured identical or similar to the second control field of the stationary user interface. The connection with the control unit 1 can be established via wire 99 or wireless. Preferably, a tactile feedback is associated with the input locations or keys on the display screen, in particular on the second control field. Several possibilities exist for generating tactile feedback:

Feedback is already realized optically, but is insufficient for manual control keys,
    Acoustic feedback, not always suitable due to noisy environment,
    Vibration through piezo membranes,
    Vibration through a motor with cam (like in a mobile phone),
    Mechanical translation pulses through pull-type electromagnet,
    Principle of an impact drill (spring/mass beater).

The tactile signature must be significantly different from the vibration of the machine. Tactile feedback can be realized for all keys simultaneously. Clicking the clicker keys is simulated by a brief pulse sequence of about 0.1 to 0.3 second duration, which can be efficiently performed, for example, with a small DC motor. A serrated pinion is located on the axle, which pulls with its tooth faces a small weight during a rotation, which then drops by way of a spring force onto the pane. Optimal feedback can be adjusted via the rotation speed and the duration. The novel solution enables a comfort level for different operating modes which has been unattainable to date, for example for:

Remote maintenance,
    Remote control,
    Mobile secondary control, e.g., on a movable cart.

Programming and parameterization of process sequences can be supported, in particular, as assistance by the manufacturer for the user over any distance, for example via the Internet. The general tenet of the novel invention also applies here: everything displayed on the display screen (control field 1) can also be performed on the display screen, i.e., remotely. The same applies to the key design of control field 2 which can be designed to have any size, shape and type. Individual fields can be enlarged for the operation similar to the Windows concept, in particular on the first control field.

Figure 15A:
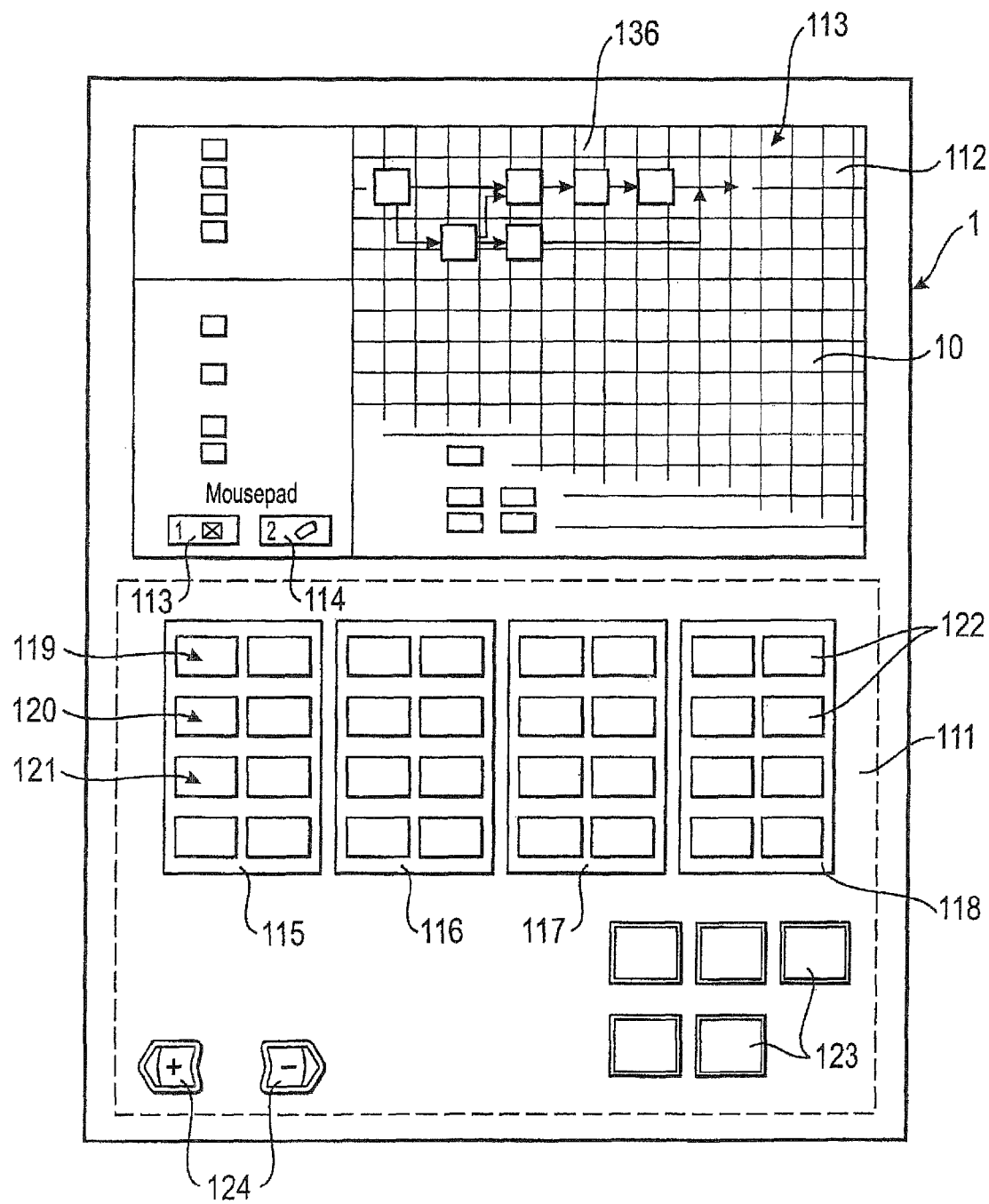
FIG. 15a show schematically an example for a user interface of the novel tactile solution.

FIG. 15a shows an exemplary tactile solution. The upper portion of the image illustrates the first programming control field 10 which is enclosed by a solid line. Immediately below is a second operative control field 111 which is enclosed by a dashed line. The first control field is used for image-wise visualization, e.g., of all process- and machine-related data, process sequence diagrams and actual process states. Programming the injection molding process is an important part of the first control field 10. An exemplary process editor is shown on the display screen, which is also shown in FIG. 10 on an enlarged scale. The display screen 112 of the first control field 10 has a sensitive surface, which makes it possible to program the input locations relative to their coordinates and directly input the same on the touchscreen. The sensitive surface is symbolically indicated by thin lines. The second control field 111 has different input locations.

Two switches 113 and 114 for selecting two operating modes are located at the lower left on the first control field. The selection switch 114 represents the classic touchscreen function for activating keys on the first control field 10. The selection key 114 can be used to select a mouse pad function as replacement for the classic mouse function. The desired input location is addressed by moving a finger on the display screen. An alternative switch-over occurs automatically when the application is switched, for example by way of the operating manual with mouse control.

The upper half 4 of the operative control field 111 shows blocks 115, 116, 117 and 118. The input locations 119, 120 and 121 already display concrete symbols "open mold" and "close mold", "eject injection-molded part" and "move injection nozzle." Two possibilities exist: According to the first possibility, concrete symbols are fixedly assigned to a few, for example 4 to 6 input locations.

These are fundamental interventions, such as:
open/close mold
advance/retract ejector
move unit
unlock machine door.

Programming can be performed at the machine manufacturer. During programming of the process sequence, these input locations are only activated as needed. The tactile input locations 119, 120, 121 are blocked for other functions. The functions of all other input locations 122 are defined via the programming or configuration on the first control field on a case-related basis. Only the components visualized in the process diagram field 136 may be occupied or defined. These can be one, two or more components or in very simple situations, even all components. It is also proposed that at least the blocks 115 116 and possibly 117 are occupied by the machine manufacturer in the context of corresponding programming. The block 118 and possibly 117 can be reserved, for example for the user. In addition, other interventions exist, which are almost always required with injection molding machines. These input locations 123 are also fixedly occupied. The same applies to the "+" (plus) key and the "−" (minus) key 124 used to increase or decrease parameter values. In the second control field, the key is on the display screen, so that graphic symbols or small videos or sequential process sequence steps and states, such as on/off, can be displayed on the individual keys. As an alternative mouse tracking, the input locations 119 may be fixed for the mold movement, but may change their function depending on the operating mode:
Manually: open/close mold
Automatically: +/−, to be used to adapt, for example, the velocity of the mold.
The concrete effect of +/− can be configured by the user, with an effect on the first or second function or both.

Figure 15B:
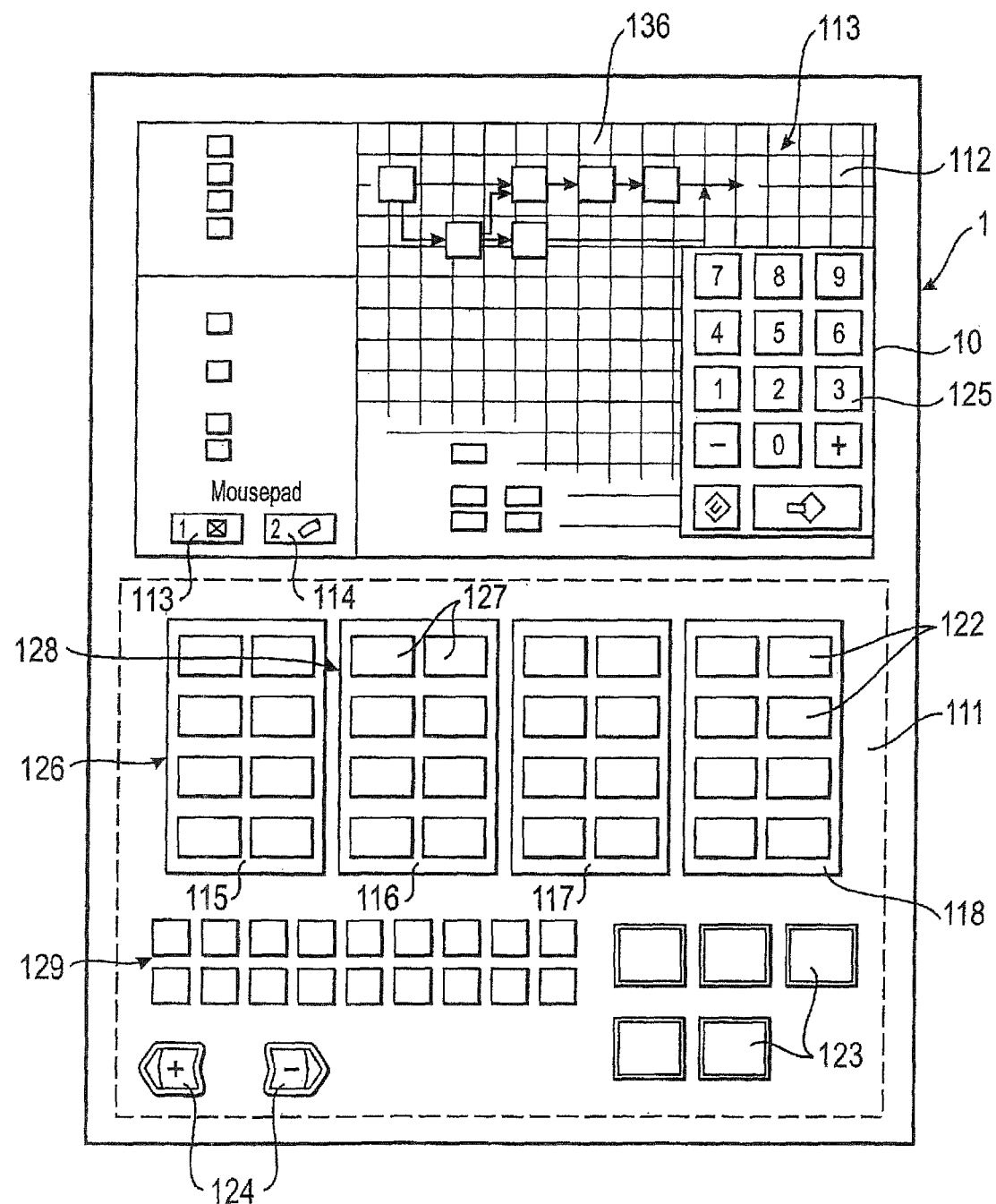
FIG. 15b shows another example for the user interface of the tactile solution.

FIG. 15b shows another embodiment of FIG. 15a. A numerical input field 125 is shown on the first control field 10. The numerical input field is represented on the display screen as a window, primarily for parameterizing the individual components. Six additional input locations 126, 127, 128 are illustrated in the second control field 111 in an activated state. These input locations are examples for a definition of the input locations according to the invention, which is done based on the programs executed in the background as well as a corresponding activation by selecting the components on the first control field 10 during configuration. In addition, additional fixed keys 129 are located on the second control field 111, which also relate to basic functions, such as cooling water, heating, hydraulic systems, power supply, etc. The numerical input field 125 is used to input the desired value for each variable process factor.

A keypad for written text can be provided on the first control field. In general, all input locations in the second control field are implemented as touchscreen input locations. With respect to their functionality, these are primarily the input locations which, when capable of multiple use, are automatically programmable for the instantaneous use, or which can be automatically changed by the controller from the first control field.

An additional enclosure 130 is illustrated in the bottom part of FIG. 15c, which houses an emergency on/off switch 131, an additional mouse pad 132, and a slot 133 for inserting a card for user identification. The key location is an interlock switch 134. 134' and 134" are additional key switches.

It is important for many applications that, for example, two or more input locations can be operated simultaneously, which must be enabled by corresponding programming. This control mode particularly relates to auxiliary controllers, for example for core pullers, ejection or blowing off injection-molded parts, etc. These input locations are arranged in the region of the blocks 115 to 118.

Figure 16A:
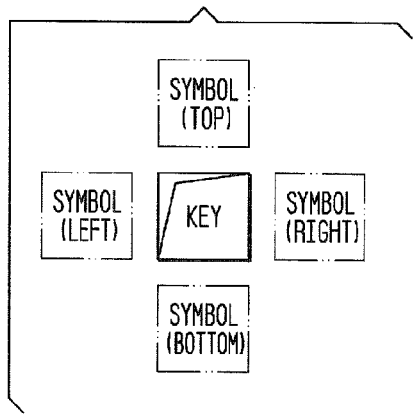
FIGS. 16a-16e show different arrangements of haptic keys and symbol fields.
Figure 16B:
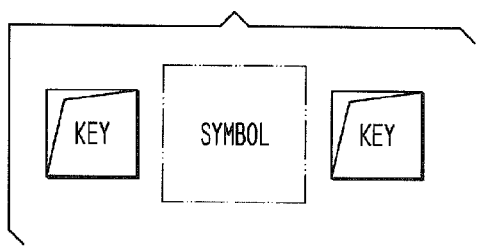
Figure 16C:
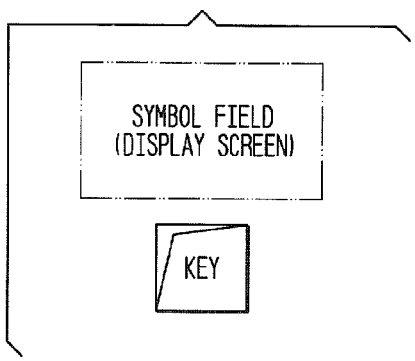
Figure 16D:
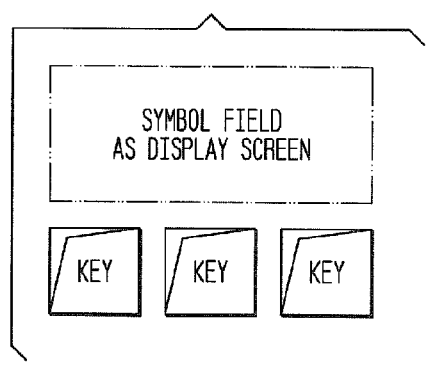
Figure 16E:
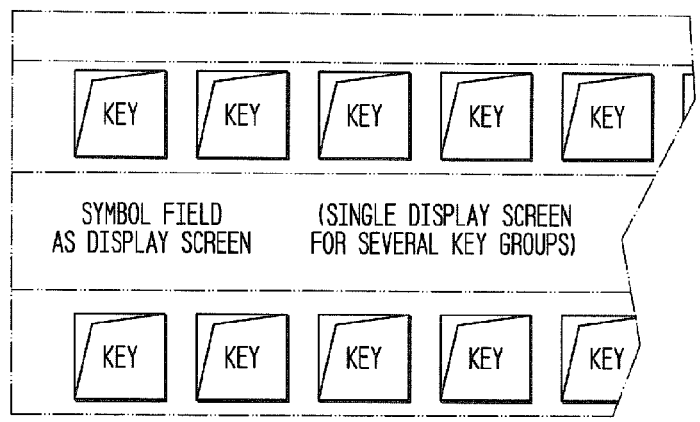

FIGS. 16 to 16c show different arrangements of the symbol fields in relation to the corresponding haptic keys. FIG. 16a illustrates that the symbol field can be arranged arbitrarily, i.e., above, below, to the left or to the right of the key. FIG. 16b shows that two keys can be associated with one symbol field. FIG. 16c shows that a symbol field for one key can be configured as a small display screen. FIG. 16d shows that a symbol field for several keys or an entire group of keys can be implemented as a display screen. FIG. 16e shows that a larger symbol field can be associated as a display screen with another group of keys. The solution is particularly suited for a situation where the second control field is additionally configured as an auxiliary computer.

Figure 17:
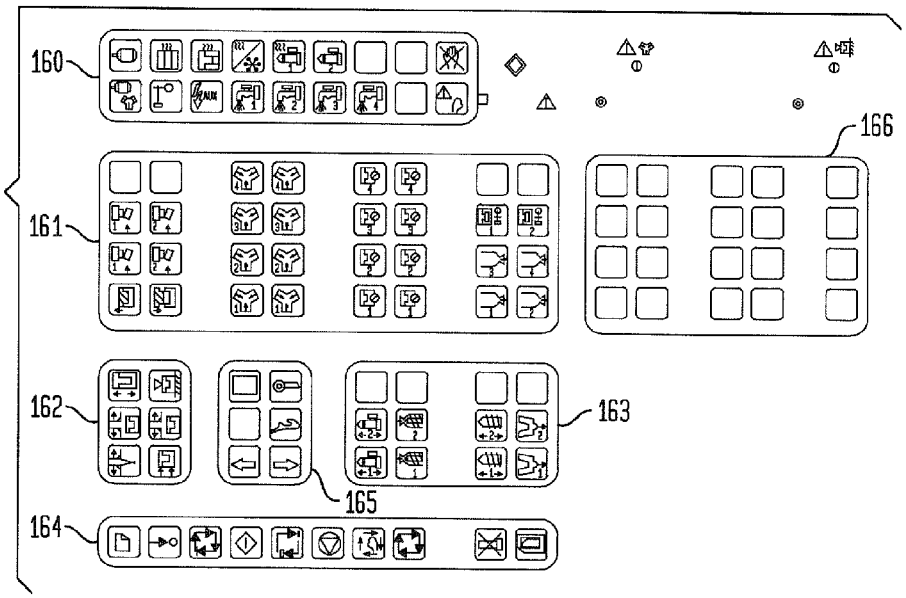
FIG. 17 shows a second control field with machine movement keys, arranged in blocks according to FIG. 1.

FIG. 17 shows exemplary machine movement keys on the second control field, corresponding to FIG. 1. According to a particular aspect of the novel invention, the machine movement keys can be arranged similarly, so that the operator is not required to make major adjustments for operating a machine with a controller according to the novel invention.

All machine movement keys are arranged according to their function in visually entirely separate blocks. Block 160 has the arrangement of keys for:
On/off switch
Input/output
Heater
Water
Robots, etc.
Block 161 includes the functions on the mold side with auxiliary controls for the movement of ejector, core pullers, mold closing, etc.
Block 162 has the keys for central movement and tool change.
Block 163 has the keys for the functions and movements of the injection molding unit:
Move/press unit,
Rotate the screw,
Move the screw linearly.
Block 164 includes the operating functions, such as
Start/stop,
Manual operation,
Automatic operation,
Other operating functions,
Moving protective cover.
Keys for special functions, such as tension release, are arranged in block 165.
Block 166 is provided for options, for example special requirements from the user.

Figure 18A:
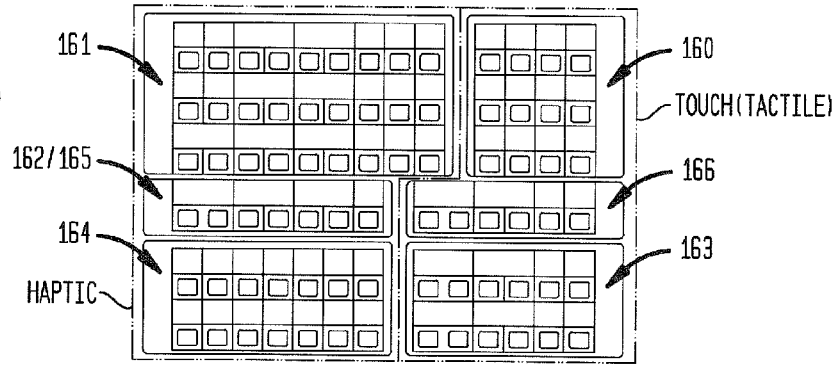
FIG. 18a shows a second control field according to the novel invention, wherein the machine movement keys also arranged in blocks with haptic and tactile keys.
Figure 18B:
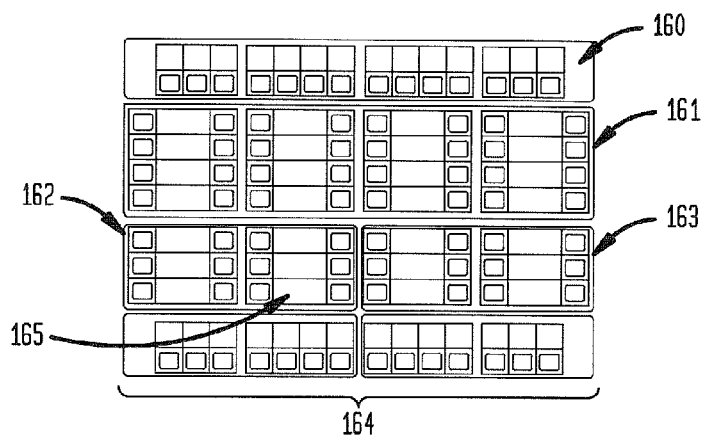
FIG. 18b shows a combination of strips and block arrangements of the machine movement keys.

FIGS. 18a and 18b show two preferred arrangements for the second control field. FIG. 18a shows another possibility for using haptic and tactile keys, wherein the three blocks on the left side on a touchscreen are haptic keys and the three blocks on the right side on the touchscreen are tactile keys. The solution according to FIG. 18a can be additionally used as an auxiliary computer. Although the blocks 160, 163 and 166 are illustrated as haptic with a symbol field 23 next to the key, the symbol fields 23 can also be located on the keys themselves.

A portion of the keys on the second control field 2 can also be purely mechanical keys. However, the blocks 161, 162 and 164 and 165 are preferably implemented as haptic keys. These represent important movement functions, also for manual operation.

FIG. 18b shows for the blocks 161, 162, 163 and 165 the possibility to associate a common symbol field 23 with two separate keys. This is particularly advantageous for movement functions, such as forward/backward or open/close. The state or the position of the object can be illustrated in the symbol field 23 as an image or in form of numbers.

What is claimed is:

1. A method for controlling a molding machine having repeatable process sequences for producing molded parts, comprising the steps of:
inputting, configuring and changing parameterization of process sequences by actuating keys, while viewing a control unit or a main display screen,
inputting and changing operative control inputs by actuating machine movement keys, while viewing the machine, wherein at least a portion of the actuated machine movement keys are keys selected from haptic keys and tactile touchscreen keys disposed on the main display screen, with the haptic keys and tactile touchscreen keys associated in one-to-one correspondence and disposed on top of the main display screen, with each of the haptic keys and tactile touchscreen keys having an associated display screen field or symbol field disposed on top of the display screen, wherein parameterization and configuration of the production process sequences are inputted and changed via keys on a first control field and the operative control inputs are inputted and changed with the machine movement keys on a second control field, wherein the second control field is in data exchange from and to the first control field, and wherein a function of at least a portion of input locations of the second control field is defined through programming on the first control field, and
programming the machine movement keys via the display screen field associated with the respective machine movement key, enabling the machine movement keys to be flexibly used, and activating a reduced number of machine movement keys in the second control field depending on the machine movement keys selected and programmed in the first control field, with the selection of the machine movement keys depending on at least one of production means, a machine function and an operating mode,
wherein for an operating mode "automatic operation", operative inputs and control commands are provided on the second control field, with operative inputs via keypad and trackball being provided in a region of the first control field, wherein corrections of operating parameters are displayed in the first control field and stored in a storage device, allowing physical quantities or parameters selected from the group consisting of speed, pressure, force, and distance to be inputted, and increased or decreased via "+" (plus) keys and "−" (minus) keys, respectively.

2. The method of claim 1, wherein the haptic keys are embodied as keys selected from the group consisting of mechanical keys, clicker keys, short-stroke keys, silicone keys, piezo switches, and capacitive switches, with the haptic keys generating haptic feedback upon actuation of a key.

3. The method of claim 1, further comprising the step of programming and making visible for each key a display screen field in a region around the key, with a corresponding control field implemented as a display screen.

4. The method of claim 1, wherein the display screen field for the machine movement keys displays machine functions selected from the group consisting of general information, status, attributes for status, conventional technical symbols, injection molding symbols, colors, static diagrams, dynamic diagrams, bar diagrams, and graphic display of images, image sequences and video sequences.

5. The method of claim 1, further including software for selecting or addressing individual components schemes on the first control field, wherein a limited number of mechanical keys of the second control field is automatically activated based on the selected schemes, with the activated keys allowing component-specific inputs.

6. The method of claim 5, wherein depending on the limited number of mechanical keys or of symbol representations on symbol fields and depending on functional relationships, a mechanical key can be used differently with an associated symbol field of other components and functional relationships.

7. The method of claim 5, wherein the second control field is operated with software which simultaneously or sequentially controls machine processes, or operates as an auxiliary computer for processing text and numbers.

8. The method of claim 1, wherein at least a portion of the mechanical keys are individual sectors in a region of the second control field, allowing two or more mechanical keys to be operated simultaneously.

9. A controller for a molding machine with a production process having repeatable process sequences for producing molded parts, the controller comprising:
a display screen,
a machine controller, and
a control unit configured as a man-machine-interface (MMI) comprising several modules disposed on a support console and a USB controller module arranged in the support console, the control unit comprising a first control field for inputting and changing parameterization and configuration of the production process, and a second control field comprising machine movement keys for inputting and changing operative control inputs, wherein at least a portion of the machine movement keys are implemented as haptic keys disposed on the display screen and having a programmable machine function, and wherein a display screen field or symbol field is directly associated with each machine movement key.

10. The controller of claim 9, wherein the haptic keys are implemented as mechanical keys selected from the group consisting of clicker keys, short-stroke keys, silicone keys, piezo switches, and capacitive switches, wherein operation of each key produces a haptic feedback.

11. The controller of claim 9, wherein the machine movement keys are arranged inside the control unit or on a control area of the control unit and implemented as a glued-on strip, as an embedded strip or as glued-on mechanical keys.

12. The controller of claim 11, wherein the machine movement keys are arranged on the display screen in form of strips or blocks in the control area.

13. The controller of claim 12, wherein the haptic keys are applied on a display screen in form of strips having associated symbol fields or as several small display screens, wherein the strips with the associated symbol fields or the small display screens of the haptic keys are alternatingly arranged on the display screen between the strips of the machine movement keys.

14. The controller of claim 9, wherein individual keys comprise a display screen field programmed in an area around the key and configured to be visible.

15. The controller of claim 9, wherein a machine movement keys with the associated display screen field associated with a machine movement key is programmable and activatable depending on a machine function.

16. The controller of claim 9, wherein a machine movement key with the display screen field associated with the machine movement key is programmable for flexible use, wherein the flexible use allows a reduced number of machine movement keys to be activated depending on a selection of production means, a machine function or an operating mode, or a combination thereof.

17. The controller of claim 9, wherein the controller includes software for functions of the machine keys, wherein the software is configured to automatically display activatable input locations on the symbol fields.

18. The controller of claim 9, wherein the machine movement keys with the corresponding associated symbol fields have at least one function selected from the group consisting of an illuminated display as status display, a display of a symbol related to functions to be activated by the keys, a display of a symbol related to the significance of the function of a key, a control input and control command for changing production parameters, and images, image sequences and video sequences.

19. The controller of claim 9, wherein the man-machine-interface (MMI) is of modular construction and comprises a single display screen having at least two areas, with the first and second control field displayed in separate areas on the single display screen, or comprises at least two separate display screens, with the first and second control field displayed on separate display screens.

20. The controller of claim 19, wherein a basic module comprises a hand-held control module for operative intervention or for an auxiliary computer function, and a display screen module for configuration and parameterization of the process sequence.

21. The controller of claim 9, wherein the machine movement keys with the associated symbol fields are programmable for operative interventions on the machine or as an auxiliary computer, wherein when programmed as an auxiliary computer, at least a portion of the haptic keys are used as configurable input keypad, and the symbol fields are used as display screen for processing text and numbers.

22. The controller of claim 9, wherein the display screen fields for the machine movement keys are implemented as individual small display screens for a single key or as small display screens for several keys or on one or several larger display screens.

\* \* \* \* \*